United States Patent
Tanaka et al.

(10) Patent No.: US 9,438,461 B2
(45) Date of Patent: Sep. 6, 2016

(54) COMMUNICATION SYSTEM, RECEIVING DEVICE, AND SEMICONDUCTOR DEVICE

(71) Applicant: FUJITSU LIMITED, Kawasaki-shi, Kanagawa (JP)

(72) Inventors: Daijiro Tanaka, Fuchu (JP); Yohei Koganei, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 2 days.

(21) Appl. No.: 14/644,934

(22) Filed: Mar. 11, 2015

(65) Prior Publication Data

US 2015/0295747 A1 Oct. 15, 2015

(30) Foreign Application Priority Data

Apr. 15, 2014 (JP) ................................. 2014-084044

(51) Int. Cl.
| | |
|---|---|
| *H04L 5/12* | (2006.01) |
| *H04L 27/34* | (2006.01) |
| *H04B 10/00* | (2013.01) |
| *H04L 27/00* | (2006.01) |

(52) U.S. Cl.
CPC ........... *H04L 27/3444* (2013.01); *H04B 10/00* (2013.01); *H04L 27/0014* (2013.01); *H04L 2027/0024* (2013.01); *H04L 2027/0067* (2013.01)

(58) Field of Classification Search
CPC ............... H04L 27/34; H04L 27/3444; H04L 27/0014; H04L 27/0024; H04L 2027/0067; H04B 10/5561; H04B 10/6165; H04B 10/00
See application file for complete search history.

(56) References Cited

U.S. PATENT DOCUMENTS

| 4,879,728 A | * | 11/1989 | Tarallo | H04L 27/2273 329/306 |
|---|---|---|---|---|
| 5,705,958 A | * | 1/1998 | Janer | H04L 27/364 329/304 |
| 2008/0043870 A1 | * | 2/2008 | Oshima | H03M 13/256 375/260 |
| 2010/0138722 A1 | | 6/2010 | Harley et al. | |
| 2013/0089342 A1 | * | 4/2013 | Oveis Gharan | H04B 10/6165 398/208 |
| 2013/0336649 A1 | * | 12/2013 | Essiambre | H04L 27/06 398/27 |
| 2014/0003555 A1 | | 1/2014 | Shigihara et al. | |
| 2014/0281832 A1 | * | 9/2014 | Zhang | G06F 11/10 714/776 |

FOREIGN PATENT DOCUMENTS

| JP | 2007-053571 | 3/2007 |
|---|---|---|
| WO | WO 2010/063092 A1 | 6/2010 |
| WO | WO 2012/132103 A1 | 10/2012 |

* cited by examiner

*Primary Examiner* — Syed Haider

(74) *Attorney, Agent, or Firm* — Staas & Halsey LLP

(57) ABSTRACT

A communication system includes a transmission device that transmits a signal, based on a plurality of symbol coordinates on a constellation, which characterize a shape having a predetermined rotational asymmetrical shape, and a receiving device that accumulates symbol coordinates on the constellation in the signal received from the transmission device and estimates the phase of the signal received from the transmission device, based on a difference between the direction of a shape characterized by the accumulated symbol coordinates and the direction of the predetermined shape.

11 Claims, 20 Drawing Sheets

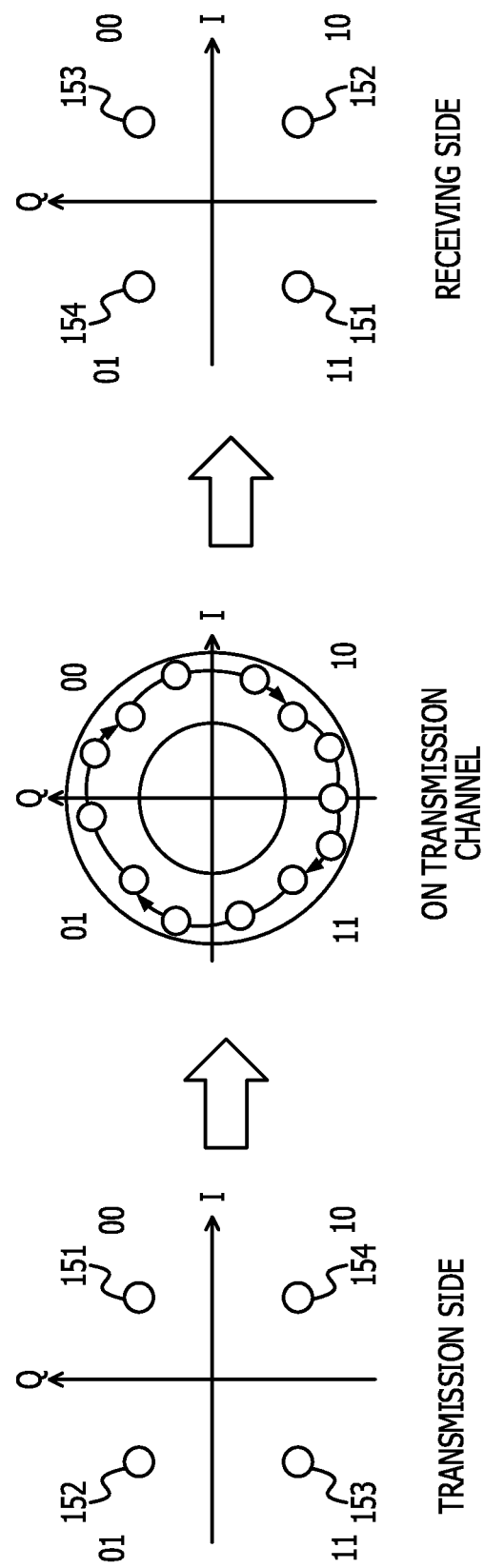

COMMUNICATION SYSTEM, RECEIVING DEVICE, AND SEMICONDUCTOR DEVICE

CROSS-REFERENCE TO RELATED APPLICATIONS

This application is based upon and claims the benefit of priority of the prior Japanese Patent Application No. 2014-084044, filed on Apr. 15, 2014, the entire contents of which are incorporated herein by reference.

FIELD

The embodiments discussed herein are related to a communication system, a receiving device, and a semiconductor device.

BACKGROUND

Conventionally, there are circuits that correct, when the amount of change in phase compensation exceeds a threshold and thus the generation of a slip is detected, phase change due to the slip by adding a phase correction amount obtained from the amount of change in phase compensation to the phase of a signal the phase deviation of which has been compensated. For example, such a circuit is disclosed in International Publication Pamphlet No. WO 2012/132103. There are methods in which a known signal, such as a known bit or code, is embedded between a synchronizing burst that is periodically inserted in an optical signal and a consecutive synchronizing burst and detection and correction of a cycle slip by the known signal is performed at a receiving side. For example, such a method is disclosed in International Publication Pamphlet No. WO 2010/063092. There are devices that detect the generation of a phase slip by inserting a known signal in a transmission data stream at certain intervals at a transmission side, obtaining a known signal from a reception data stream at a receiving side, and calculating a relative phase difference between the known signals. For example, such a device is disclosed in Japanese Laid-open Patent Publication No. 2007-053571.

SUMMARY

According to an aspect of the invention, a communication system includes a transmission device that transmits a signal, based on a plurality of symbol coordinates on a constellation, which characterize a shape having a predetermined rotational asymmetrical shape, and a receiving device that accumulates symbol coordinates on the constellation in the signal received from the transmission device and estimates the phase of the signal received from the transmission device, based on a difference between the direction of a shape characterized by the accumulated symbol coordinates and the direction of the predetermined shape.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1B is a diagram illustrating an example of a phase slip in QPSK;

DESCRIPTION OF EMBODIMENTS

First and second embodiments of a technique disclosed herein will be described in detail below with reference to the accompanying drawings.

(First Embodiment)

(Functional Configuration of Communication System)

Figure 1A:
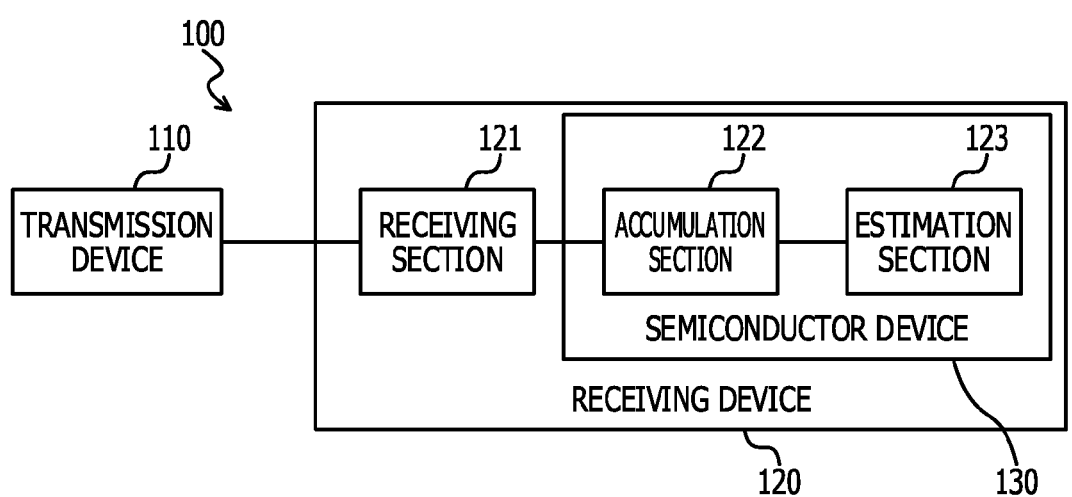
FIG. 1A is a block diagram illustrating an example of a functional configuration of a communication system according to a first embodiment.

FIG. 1A is a block diagram illustrating an example of a functional configuration of a communication system according to a first embodiment. As illustrated in FIG. 1A, a communication system 100 includes a transmission device 110 and a receiving device 120. The transmission device 110 transmits, to the receiving device 120, a signal symbol coordinates of which are arranged such that a shape (which will be hereinafter referred to as "a symbol shape") characterized by a plurality of symbol coordinates on a constellation has a rotational asymmetrical shape (for example, a trapezoidal shape).

A signal that is transmitted is a signal generated by modulation including at least phase modulation and may be a signal including amplitude modulation. A signal that is transmitted is specifically a signal that is modulated by phase shift keying or quadrature amplitude modulation. Phase shift keying is, for example, quadrature phase shift keying, which is referred to as QPSK. Quadrature amplitude modulation is referred to as QAM.

A signal that is transmitted is a signal based on a plurality of symbol coordinates that form a symbol shape having a predetermined rotational asymmetrical shape. A constellation is a diagram illustrating a complex plane, and specifically, a diagram in which the abscissa indicates an I (In-phase) component and the ordinate indicates a Q (quadrature) component. A symbol arranged on a constellation indicates the amplitude and phase of a signal, centering around the origin, that is, the orthogonal coordinates of the I axis and the Q axis. The distance from the origin represents the amplitude, and the angle from the origin represents the phase.

A symbol shape is a shape characterized by a plurality of symbol coordinates on a constellation. A shape characterized by a plurality of symbol coordinates is, for example, a shape made by connecting adjacent symbol coordinates, among the plurality of symbol coordinates, to each other with a line. A symbol shape is indicated by symbol coordinates, and may be indicated by component of the symbol shape, that is, the direction indicated by the symbol shape and the shape of the symbol shape. Specifically, a plurality of symbol shapes differ from one another, if one of the direction and shape differs among the plurality of symbol shapes.

The term "rotational asymmetrical" is intended to indicate a case where, when a shape is rotated by a predetermined angle on a constellation, rotational symmetry is not achieved. A predetermined shape that is a rotational asymmetrical shape is, for example, a shape that does not have the same shape while rotating one revolution (that is, while the shape is rotated by a predetermined angle that is greater than 0 degrees and less than 360 degrees), centering around the origin on a constellation. The predetermined shape is, for example, a trapezoidal shape. A trapezoidal shape herein is, for example, an isosceles trapezoidal shape (that is, a trapezoidal in which angles of both ends of parallel sides are mutually equal and sides that are not parallel have mutually the same length).

Also, the predetermined shape is not limited to a trapezoidal shape. Details will be later described in a second embodiment but, for example, a position of symbol coordinates, among the plurality of symbol coordinates that characterize the predetermined shape, may be arranged such that the distance of the position of the symbol coordinates, among the plurality of symbol coordinates that characterize the predetermined shape from the origin on the constellation, is different from that of another position of symbol coordinates, among the plurality of symbol coordinates. The predetermined shape that is rotational asymmetrical may be thus obtained.

A signal that is transmitted from the transmission device 110 is a signal based on mapping of a plurality of symbol coordinates that form a predetermined shape. Mapping of a plurality of symbol coordinates that form a predetermined shape is to arrange the plurality of symbol coordinates, for example, into a trapezoidal shape.

The receiving device 120 corrects symbol coordinates such that the direction indicated by the symbol shape characterized by symbol coordinates on a constellation in a signal received from the transmission device 110 is a direction indicated by a predetermined shape that has been determined in advance. The direction indicated by the predetermined shape is shared by the transmission device 110 and the receiving device 120. Thus, the receiving device 120 corrects the direction indicated by the symbol shape obtained from the signal received from the transmission device 110 to the direction indicated by the predetermined shape shared with the transmission device 110.

To specifically describe, the receiving device 120 includes a receiving section 121 and a semiconductor device 130. The semiconductor device 130 includes an accumulation section 122 and an estimation section 123. The receiving section 121 receives a signal from the transmission device 110. The accumulation section 122 accumulates symbol coordinates on a constellation in a signal received by the receiving section 121. To accumulate is to store symbol coordinates for signals received in a certain period from the current time point to a time point in the past or signals going back by a certain amount in order to obtain an average of symbol coordinates.

The estimation section 123 estimates the phase of a signal received from the transmission device 110, based on a difference between the directions of a shape (which will be hereinafter referred to as "a calculated shape") characterized by symbol coordinates accumulated by the accumulation section 122 and the predetermined shape. The calculated shape is a symbol shape that is obtained, for example, by calculating an average of the positions of the symbol coordinates for signals received in a certain period in the past or signals going back by a certain amount. For example, for example, in QPSK, the symbol coordinates accumulated by the accumulation section 122 are used for calculating the average for each of first to fourth quadrants. The calculated shape is a shape obtained by connecting adjacent ones of calculated averages of symbol coordinates for each of the quadrants with a line.

The difference between the directions of the calculated shape and the predetermined shape is a difference between the directions indicated by the shapes. For example, assuming that the direction indicated by the predetermined shape is 0 degrees and the direction indicated by the calculated shape is rotated by 90 degrees relative to the predetermined shape, the difference between the directions of the calculated shape and the predetermined shape is 90 degrees. For example, if the difference between the directions of the calculated shape and the predetermined shape is 90 degrees, the estimation section 123 estimates the phase of a signal received from the transmission device 110 by rotating each of the plurality of symbol coordinates that indicates the calculated shape by −90 degrees, centering around the origin on the constellation. Note that it is not limited to symbol coordinates that are rotated and a coordinate axis may be rotated.

To estimate the phase of a signal, based on the difference between the directions of the calculated shape and the predetermined shape, is for the estimation section 123 to correct, based on the difference between the calculated shape and the predetermined shape, the phase of a signal estimated by a phase estimation circuit of the receiving device 120, based on accumulated symbol coordinates. Also, to estimate the above-described phase may be for the phase estimation circuit of the estimation section 123 to estimate a phase rotation amount in a signal, based on the difference between the calculated shape and the predetermined shape and estimate the phase of a signal, based on the estimated phase rotation amount and the accumulated symbol coordinates.

There are cases where the symbol shape is distorted due to an error, or the like. In order to correct the distortion, the transmission device 110 may transmit a signal while switching around a plurality of symbol coordinates (which will be hereinafter referred to as "a first symbol coordinate group") and a second symbol coordinate group obtained by rotating the first symbol coordinate group by a predetermined angle, centering around the origin on the constellation. The predetermined angle is, for example, 180 degrees.

In this case, the difference between the directions of the calculated shape and the predetermined shape may be a difference based on a third symbol coordinate group in a first signal received from the transmission device 110, a fourth symbol coordinate group in a second signal received from the transmission device 110, and the predetermined angle. The third symbol coordinate group includes a plurality of symbol coordinates that are the same as those of the first symbol coordinate group or a plurality of symbol coordinates that correspond to the rotation angles of the symbol coordinates that rotate on a transmission channel. The fourth symbol coordinate group includes a plurality of symbol coordinates that are the same as those of the second symbol coordinate group or a plurality of symbol coordinates that correspond to the rotation angles of the symbol coordinates that rotate on a transmission channel.

Specifically, the difference between the directions of the calculated shape and the predetermined shape is a difference between a shape characterized by the third symbol coordinate group and the fourth symbol coordinate group at least one of which has been corrected, based on the predetermined angle, by the estimation section 123.

To specifically describe this case, the receiving section 121 receives signals based on the third symbol coordinate group and the fourth symbol coordinate group from the transmission device 110. The estimation section 123 corrects at least one of the third symbol coordinate group and the fourth symbol coordinate group in signals received by the receiving section 121, based on the predetermined angle (180 degrees).

The estimation section 123, for example, rotates the fourth symbol coordinate group by 180 degrees in an opposite direction to the rotation direction by transmission device 110 and calculates an average of the rotated fourth symbol coordinate group and the third symbol coordinate group to correct them. Note that it is not limited to only the fourth symbol coordinate group that is rotated, but only the third symbol coordinate group may be rotated or both of the third and fourth symbol coordinate groups may be rotated to perform correction. Thus, a distortion of the symbol shape may be reduced.

The estimation section 123 estimates the phase of a signal received by the receiving section 121, based on the difference between the directions of the shape (the calculated shape) characterized by the third symbol coordinate group and the fourth symbol coordinate group at least one of which has been corrected and the predetermined shape. That is, the estimation section 123 estimates the phase of a signal, based on the difference between the direction of the calculated shape of which a distortion has been reduced and the direction of the predetermined shape. Thus, a distortion of the symbol shape may be reduced and the phase may be estimated.

Now, a phase slip in QPSK will be described. FIG. 1B is a diagram illustrating an example of a phase slip in QPSK.

In FIG. 1B, the abscissa indicates an I component and the ordinate indicates a Q component. As illustrated in FIG. 1B, each symbol is arranged at one of positions of 45 degrees (=00), 135 degrees (=01), 225 degrees (=11), and 315 degrees (=10), and is represented by two bits (four values).

In the transmission device 110, for example, assume that a symbol 151, a symbol 152, a symbol 153, and a symbol 154 are arranged at the position of 45 degrees, the position of 135 degrees, the position of 225 degrees, and the position of 315 degrees, respectively, and a signal is transmitted on a transmission channel. Each of the symbols 151 to 154 rotates on the transmission channel.

Then, when the receiving device 120 receives a signal, each of the positions of the symbols 151 to 154 is shifted. For example, as illustrated in FIG. 1B, in the receiving device 120, a phase slip in which each of the symbol coordinates 151 to 154 is shifted by 180 degrees, as compared to the arrangement at the time of transmission by the transmission device 110, occurs. Note that an angle by which the position is shifted in the phase slip of QPSK is one of 90 degrees, 180 degrees, and 270 degrees. If the position is shifted by 360 degrees, the phase of each of the symbols matches the phase thereof when the angle by which the position is shifted is 0 degrees, and therefore, there is no phase shift.

In order to reduce such a phase slip, in the first embodiment, symbol mapping is performed such that a rotational asymmetrical shape, such as a trapezoidal shape, and the like, is obtained and thus transmits a signal, thereby enabling determination of a phase slip at the receiving side.

(An Example of Transmission Device)

Figure 2:
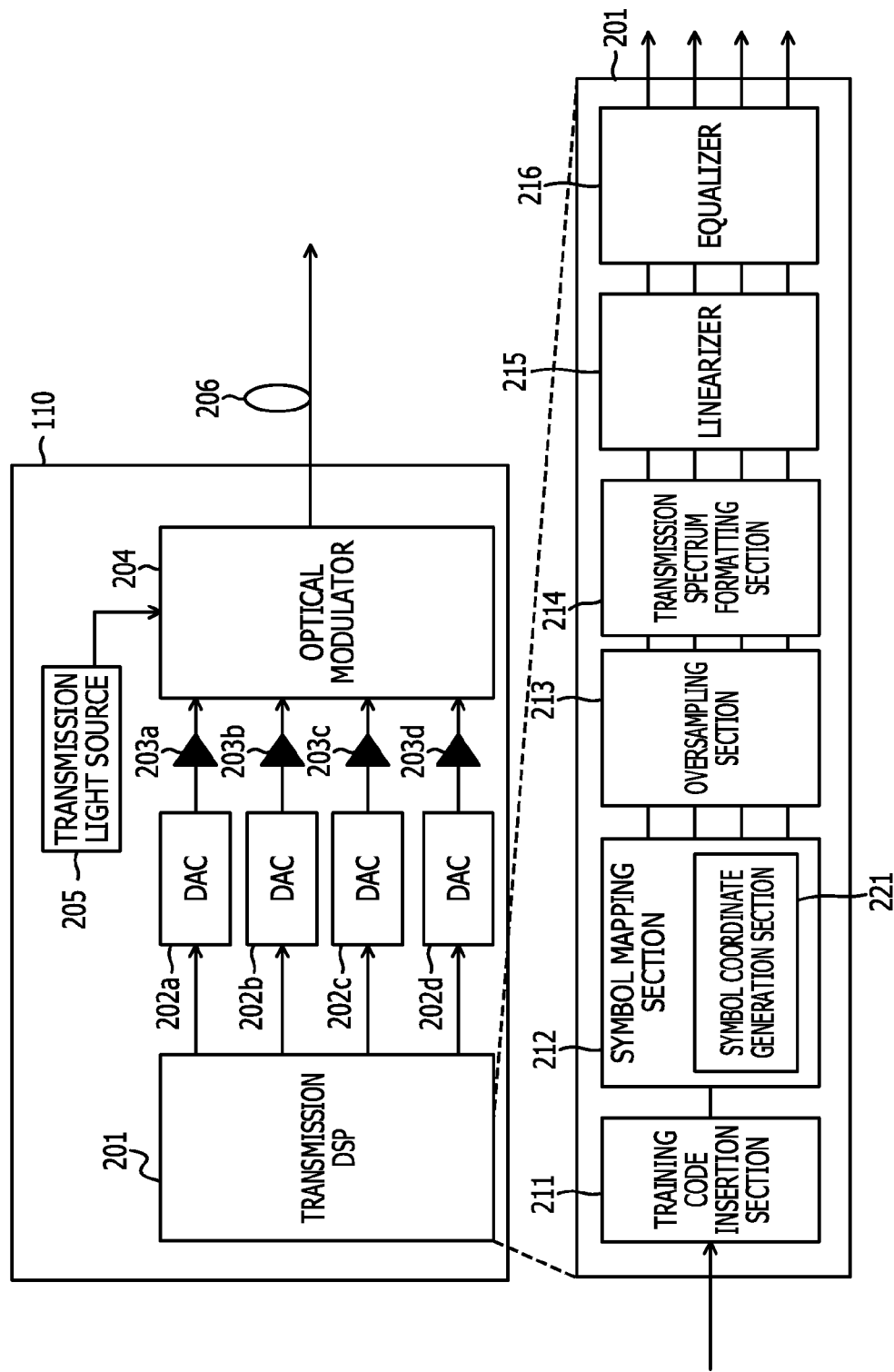
FIG. 2 is a diagram illustrating an example of a transmission device.

FIG. 2 is a diagram illustrating an example of a transmission device. As illustrated in FIG. 2, the transmission device 110 includes a transmission digital signal processor (DSP) 201, a digital to analog converter (DAC) 202, a driver amplifier 203, an optical modulator 204, and a transmission light source 205.

The transmission DSP 201 is a digital signal processing circuit, which generates a digital electrical signal for transmission and outputs the electrical signal to a plurality of (for example, four) DACs 202 (202a, 202b, 202c, and 202d). The transmission DSP 201 includes a training code insertion section 211, a symbol mapping section 212, an oversampling section 213, a transmission spectrum formatting section 214, a linearizer 215, and an equalizer 216.

The training code insertion section 211 performs processing of extracting information used for synchronization processing of a frame and dispersion compensation, and outputs a signal on which such processing has been performed to the symbol mapping section 212. The symbol mapping section 212 determines the position (coordinates) of a symbol used for performing symbol mapping on a constellation. The symbol mapping section 212 includes a symbol coordinate generation section 221.

The symbol coordinate generation section 221 generates symbol coordinates. The symbol coordinate generation section 221 generates, for example, symbol coordinates such that a symbol shape characterized by a plurality of symbol coordinates on a constellation has anisotropy, such as an isosceles trapezoidal shape, or the like.

Anisotropy is a property in which a symbol shape indicates a different direction due to rotation, and is synonymous with asymmetry. Specifically, anisotropy is a property of having a shape that does not have the same symbol shape while the symbol shape on a constellation is rotated by a predetermined angle (for example, greater than 0 degrees and less than 360 degrees). The symbol shape on the constellation is made to have anisotropy, and thus, which direction the symbol shape faces may be detected at the receiving device 120 side.

For example, in QPSK, symbols are at four positions, that is, 45 degrees, 135 degrees, 225 degrees, and 315 degrees in a normal situation. For one or more of the four symbols, the symbol coordinate generation section 221 makes the symbol shape on the constellation to have anisotropy by arranging the position or positions of the one or more of the four symbols closer to and more distant from the I axis direction or the Q axis direction. In the first embodiment, the symbol coordinate generation section 221 generates a symbol coordinate of each coordinate such that a trapezoidal symbol shape is indicated.

The symbol mapping section 212 outputs a signal based on the generated symbol coordinates to the oversampling section 213. The oversampling section 213 converts a signal input from the symbol mapping section 212 to a signal of the double period in order to perform spectrum control of transmission. The oversampling section 213 outputs the signal converted to have the double period to the transmission spectrum formatting section 214.

The transmission spectrum formatting section 214 formats transmission spectrum by filtering a signal output from the oversampling section 213, and outputs the formatted signal to the linearizer 215. The transmission spectrum formatting section 214 uses, for example, a nyquist filter. The linearizer 215 corrects, for example, a distortion of a signal in terms of level, which is output from the transmission spectrum formatting section 214, to a straight line, and outputs the corrected signal to the equalizer 216. The equalizer 216 corrects, for example, the rounding of a high-speed signal due to a distortion of a hardware, and outputs the corrected signal to DAC 202.

A plurality of (for example, four) DACs 202 are provided, and each of the DACs 202 converts a digital electrical signal output from the transmission DSP 201 to an analog electrical signal. Each DAC 202 (202*a*, 202*b*, 202*c*, and 202*d*) outputs the converted electrical signal to the corresponding driver amplifier 203 (203*a*, 203*b*, 203*c*, and 203*d*).

A plurality of driver amplifiers 203 are provided so as to correspond to the plurality of DACs 202, and each of the driver amplifiers 203 amplifies a signal output from the corresponding DAC 202, and outputs the amplified signal to the optical modulator 204. The optical modulator 204 modulates signals output from the driver amplifiers 203 using light emitted from the transmission light source 205, and generates an optical signal. The optical modulator 204 outputs the generated optical signal to a transmission channel 206.

(An Example of Receiving Device)

Figure 3:
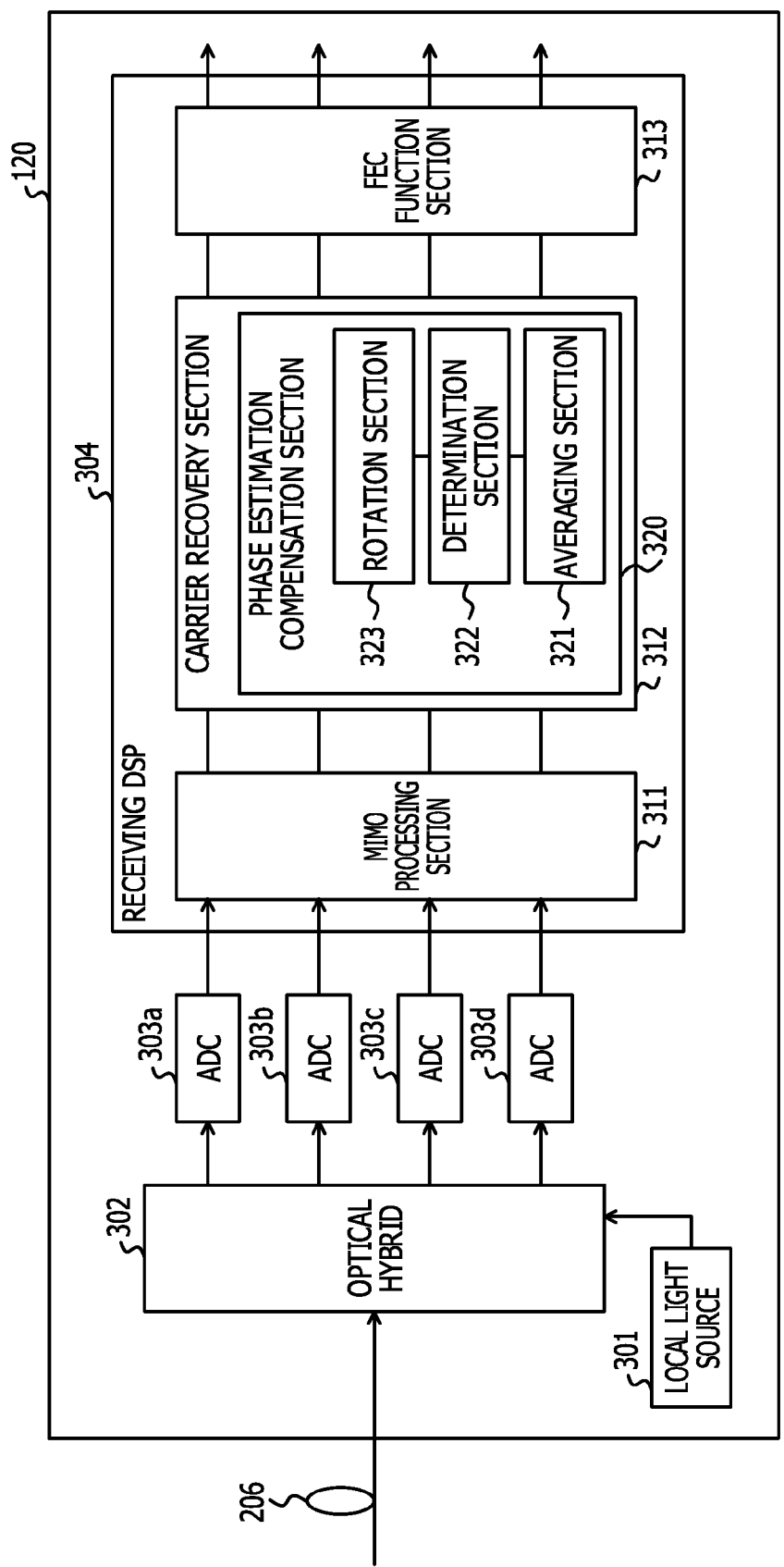
FIG. 3 is a diagram illustrating an example of a receiving device.

FIG. 3 is a diagram illustrating an example of a receiving device. As illustrated in FIG. 3, the receiving device 120 includes a local light source 301, an optical hybrid 302, analog to digital converters (ADCs) 303 (303*a*, 303*b*, 303*c*, and 303*d*), and a receiving DSP 304.

The receiving device 120 is a coherent optical receiving device using the optical hybrid 302. The local light source 301 generates local oscillation light, and outputs the generated local oscillation light to the optical hybrid 302. The optical hybrid 302 receives a reception optical signal transmitted from the transmission channel 206 (the transmission device 110) and local oscillation light emitted from the local light source 301. The optical hybrid 302 extracts a real part signal and an imaginary part signal of two cross polarizations of the input reception optical signal using the input local oscillation light.

Specifically, the optical hybrid 302 includes two polarization beam splitters and two 90-degree hybrids (which are all not illustrated). The optical hybrid 302 divides the reception optical signal and the local oscillation light into optical signals in two polarization directions (an H axis and a V axis) with the polarization beam splitters and extracts a real part component (an I component) and an imaginary part component (a Q component) from an optical signal using local oscillation light in each of the polarization directions with the 90-degree hybrids.

The optical hybrid 302 includes a plurality of (for example, four) photo diodes (PD), and photoelectric-converts an optical signal corresponding to the amplitude and phase of an I component of signal light of the H axis (a horizontal polarized wave) and an optical signal corresponding to the amplitude and phase of a Q component of signal light of the H axis. Also, the optical hybrid 302 photoelectric-converts an optical signal corresponding to the amplitude and phase of an I component of signal light of the V axis (a vertical polarized wave) and an optical signal corresponding to the amplitude and phase of a Q component of signal light of the V axis. Then, the optical hybrid 302 outputs an electrical signal in accordance with the intensity of received light to corresponding ADC 303.

ADC 303 performs digital conversion by performing digital-sampling of signals output from the optical hybrid 302 and quantizing the sampled signals. ADC 303 outputs a digital converted signal to the receiving DSP 304.

The receiving DSP 304 includes a multi input multi output (MIMO) processing section 311, a carrier recovery section 312, and a forward error correction (FEC) functional section 313. The MIMO processing section 311 performs predetermined processing, such as, for example, polarization division of a polarization multiplexed signal, and the like. The MIMO processing section 311 outputs a signal on which the predetermined processing has been performed to the carrier recovery section 312.

The carrier recovery section 312 compensates, for example, wavelength dispersion of a signal output from the MIMO processing section 311. The carrier recovery section 312 outputs a signal the wavelength dispersion of which has been compensated to the FEC functional section 313. The FEC functional section 313 corrects an error of a signal output from the carrier recovery section 312. The FEC functional section 313 outputs a signal on which error correction has been performed to a subsequent stage.

The carrier recovery section 312 includes a phase estimation compensation section 320. The phase estimation compensation section 320 detects a phase slip of a constellation and compensates the phase slip. In this case, in receiving a digital coherent, in order to correctly receive transmitted data, a phase slip due to rotation of symbol coordinates is compensated. A phase slip occurs due to phase noise of the transmission channel 206, frequency fluctuation of transmission light and reception local oscillation light, or the like, when processing of a phase estimation circuit (a carrier phase recovery or CPR) of the phase estimation compensation section 320 is performed.

When a phase slip occurs, symbol coordinates on a constellation are in a state of being rotated by 90 degrees, 180 degrees, or 270 degrees at the transmission side and the receiving side. In this state, a symbol appears in a quadrant different from coordinates intended by the transmission side, and therefore, communication is not correctly performed. Therefore, the phase estimation compensation section 320 compensates a phase slip of a constellation, for example, for a signal that has undergone processing of CPR.

Specifically, the phase estimation compensation section 320 includes an averaging section 321, a determination section 322, and a rotation section 323. The averaging section 321 calculates average coordinates of symbol coordinates for each quadrant for a received signal. The determination section 322 determines the direction of a trapezoidal symbol shape on the constellation using the average coordinates of the symbol coordinates for each quadrant, which are calculated by the averaging section 321. Assume that a timing of determination is a timing after a certain period has elapsed or a timing after a certain amount of signals are accumulated, and symbol coordinates are arranged in at least four quadrants. The rotation section 323 rotates the I axis, the Q axis, and average coordinates that characterize a symbol shape, based on a result of determination performed by the determination section 322.

Thus, a phase slip may be compensated. In the description above, compensation of a phase slip is performed after processing of CPR, and therefore, the phase may be estimated with high accuracy by simple processing. It is also possible to determine a phase slip simultaneously with processing of CPR, and thus, the phase may be estimated with high accuracy with a small-scale circuit.

Note that the receiving section 121 illustrated in FIG. 1A may be realized, for example, by the local light source 301, the optical hybrid 302, and ADC 303. Also, the semiconductor device 130 illustrated in FIG. 1A may be realized, for example, by the receiving DSP 304. Specifically, as illustrated in FIG. 1A, the accumulation section 122 and the estimation section 123 may be realized, for example, by the phase estimation compensation section 320.

(An Example of Constellation of Signal that is Transmitted by Transmission Device)

Figure 4:
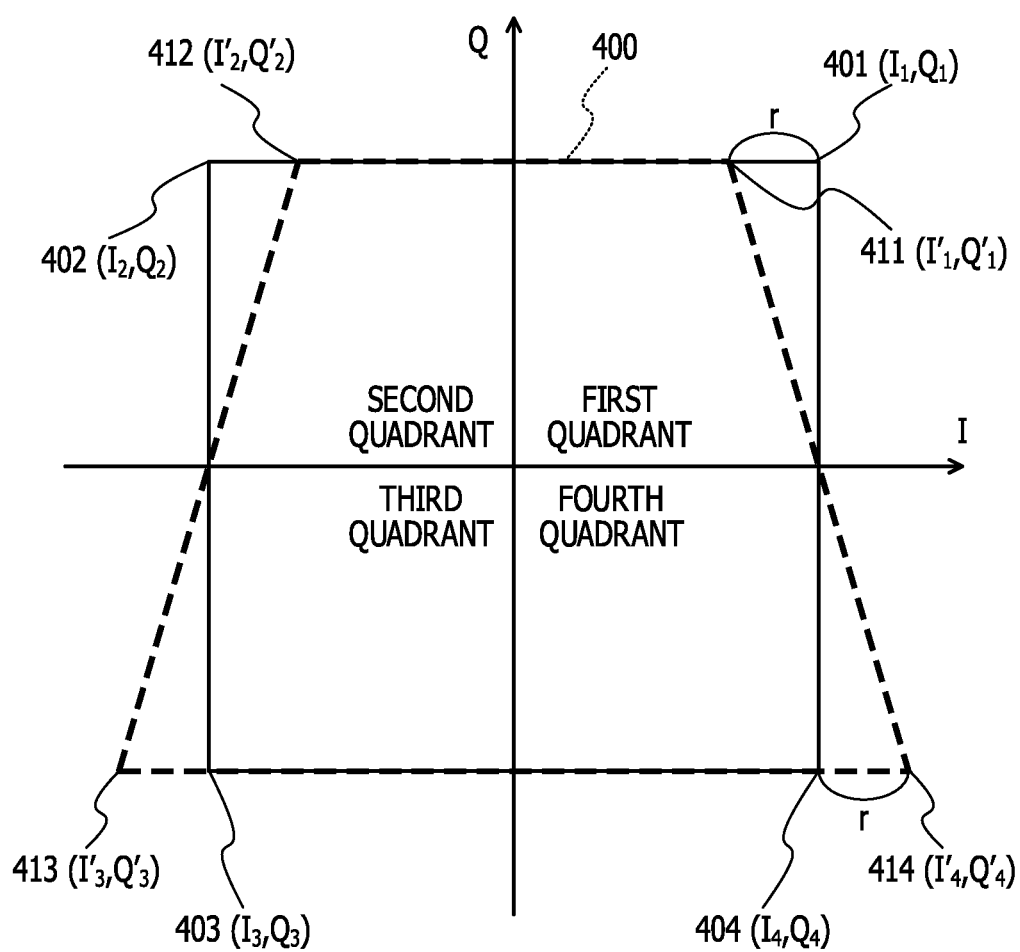
FIG. 4 is a diagram illustrating an example of a constellation of a signal that is transmitted by a transmission device.

FIG. 4 is a diagram illustrating an example of a constellation of a signal that is transmitted by a transmission device. In FIG. 4, the abscissa indicates an I component and the ordinate indicates a Q component. For example, in QPSK, the positions where symbols are arranges are symbol coordinates 401 ($I_1$, $Q_1$) of 45 degrees of the first quadrant, symbol coordinates 402 ($I_2$, $Q_2$) of 135 degrees of the second quadrant, symbol coordinates 403 ($I_3$, $Q_3$) of 225 degrees of the third quadrant, and symbol coordinates 404 ($I_4$, $Q_4$) of 315 degrees of the fourth quadrant.

In the first embodiment, the predetermined positions where symbols are arranged are symbol coordinates 411 ($I'_1$, $Q'_1$), symbol coordinates 412 ($I'_2$, $Q'_2$), symbol coordinates 413 ($I'_3$, $Q'_3$), and symbol coordinates 414 ($I'_4$, $Q'_4$), and the symbols are arranged such that a symbol shape 400 is a trapezoidal shape. A step of generating the symbol coordinates 411 to 414 may be a two-staged step of generating symbol coordinates 401 to 404 first and then shifting each of the generated symbol coordinates 401 to 404 to the corresponding one of the symbol coordinates 411 to 414, and may be a single-staged step of directly generating the symbol coordinates 411 to 414.

In comparison of the symbol coordinates 401 ($I_1$, $Q_1$) and the symbol coordinates 411 ($I'_1$, $Q'_1$) with each other, $I'_1$ is smaller than $I_1$ by only r, and $Q'_1$ is the same as $Q_1$. In comparison of the symbol coordinates 402 ($I_2$, $Q_2$) and the symbol coordinates 412 ($I'_2$, $Q'_2$), $I'_2$ is greater than $I_2$ by only r, and $Q'_2$ is the same as $Q_2$.

In comparison of the symbol coordinates 403 ($I_3$, $Q_3$) and the symbol coordinates 413 ($I'_3$, $Q'_3$) with each other, $I'_3$ is smaller than $I_3$ by only r, and $Q'_3$ is the same as $Q_3$. In comparison of the symbol coordinates 404 ($I_4$, $Q_4$) and the symbol coordinates 414 ($I'_4$, $Q'_4$), $I'_4$ is greater than $I_4$ by only r, and $Q'_4$ is the same as $Q_4$.

As described above, the transmission device 110 generates each of the symbol coordinates 411 to 414 such that a symbol shape is an isosceles trapezoidal shape on a constellation. Also, the transmission device 110 generates the symbol coordinates 411 to 414 using a direction in which the trapezoid of the symbol shape faces upward (a direction indicated in FIG. 4) as a reference direction.

(An Example of Constellation of Signal that is Received by Receiving Device)

Figure 5:
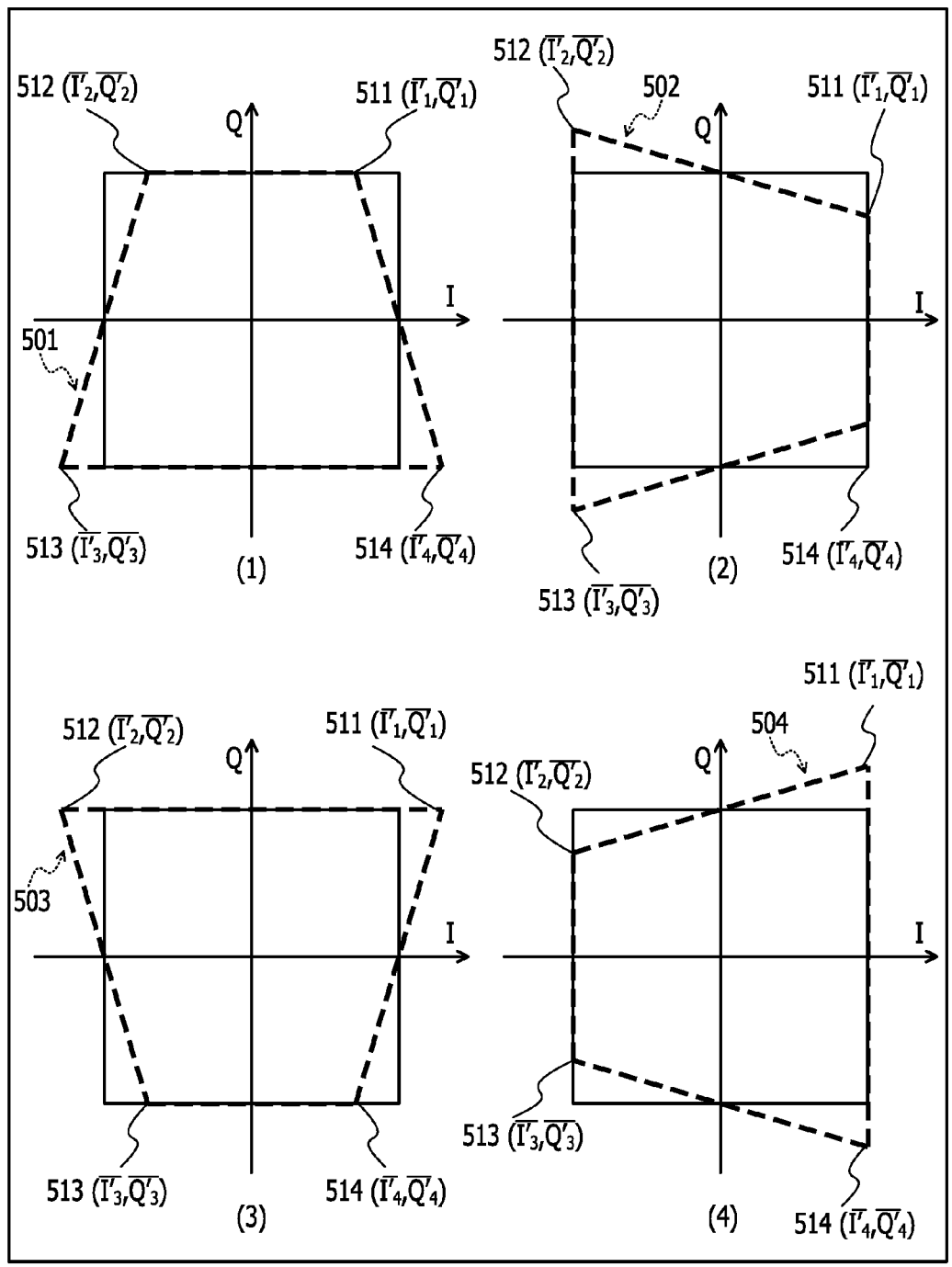
FIG. 5 is a diagram illustrating an example of a constellation of a signal that is received by a receiving device.

FIG. 5 is a diagram illustrating an example of a constellation of a signal that is received by a receiving device. In FIG. 5, the abscissa indicates an I component and the ordinate indicates a Q component. Each of symbol coordinates 511 to 514 indicates an average of symbol coordinates accumulated for a certain period.

In FIG. 5, the symbol coordinates 511 correspond to the symbol coordinates 411 (see FIG. 4), the symbol coordinates 512 correspond to the symbol coordinates 412, the symbol coordinates 513 correspond to the symbol coordinates 413, and the symbol coordinates 514 correspond to the symbol coordinates 414. A pattern of a symbol shape that is received by the receiving device 120 may be one of four reception patterns 501, 502, 503, and 504.

The reception pattern 501 illustrated in (1) is the same shape as the symbol shape characterized by the symbol coordinates 411 to 414 (see FIG. 4) generated in the transmission device 110, that is, a state in the reference direction in which each of the symbol coordinates 511 to 514 is not rotated. Note that the reception pattern 501 illustrated in (1) is herein defined as a state where a trapezoid (a symbol shape) on a constellation faces upward.

The reception pattern 502 illustrated in (2) indicates a phase slip in which each of the symbol coordinates 511 to 514 is rotated to right by 90 degrees, centering around the origin, using the reception pattern 501 as a reference. Note that the reception pattern 502 illustrated in (2) is herein defined as a state where a trapezoid (a symbol shape) on a constellation faces right.

The reception pattern 503 illustrated in (3) indicates a phase slip in which each of the symbol coordinates 511 to 514 is rotated by 180 degrees, centering around the origin, using the reception pattern 501 as a reference. Note that the reception pattern 503 illustrated in (3) is herein defined as a state where a trapezoid (a symbol shape) on a constellation faces downward.

The reception pattern 504 illustrated in (4) indicates a phase slip in which each of the symbol coordinates 511 to 514 is rotated to left by 90 degrees, centering around the origin, using the reception pattern 501 as a reference. Note that the reception pattern 504 illustrated in (4) is herein defined as a state where a trapezoid (a symbol shape) on a constellation faces left.

As described above, the receiving device 120 receives a signal with one of the reception patterns 501 to 504. In the receiving device 120, a symbol shape is determined in advance using the upward direction as a reference direction. Therefore, in processing of compensating a phase slip, for example, when the receiving device 120 receives a signal with the reception pattern 501, each of the symbol coordinates 511 to 514 is rotated by 0 degrees. Also, when the receiving device 120 receives a signal with the reception pattern 502, each of the symbol coordinates 511 to 514 is rotated to left by 90 degrees, or the I axis and the Q axis are rotated to right by 90 degrees, so that the symbol shape is arranged in the reference direction.

When the receiving device 120 receives a signal with the reception pattern 503, each of the symbol coordinates 511 to 514 is rotated by 180 degrees, or the I axis and the Q axis are rotated by 180 degrees, so that the symbol shape is arranged in the reference direction. When the receiving device 120 receives a signal with the reception pattern 504, each of the symbol coordinates 511 to 514 is rotated to right by 90 degrees, or the I axis and the Q axis are rotated left by 90 degrees, so that the symbol shape is arranged in the reference direction.

(Transmission Processing that is Performed by Transmission Device)

Figure 6:
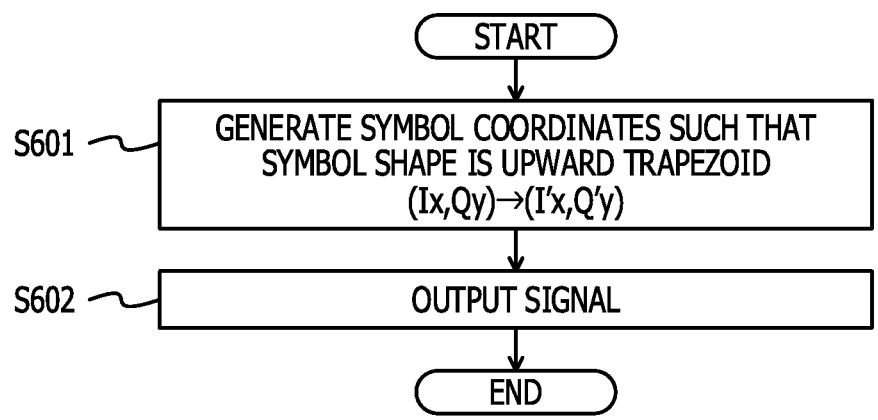
FIG. 6 is a flow chart illustrating an example of transmission processing that is performed by a transmission device.

FIG. 6 is a flow chart illustrating an example of transmission processing that is performed by a transmission device. As illustrated in FIG. 6, the transmission device 110 generates symbol coordinates such that a symbol shape is an upward trapezoidal shape on a constellation (Step S601). Then, the transmission device 110 outputs a signal based on the generated symbol coordinates to the receiving device 120 (Step S602), and ends transmission processing.

(Receiving Processing that is Performed by Receiving Device)

Figure 7:
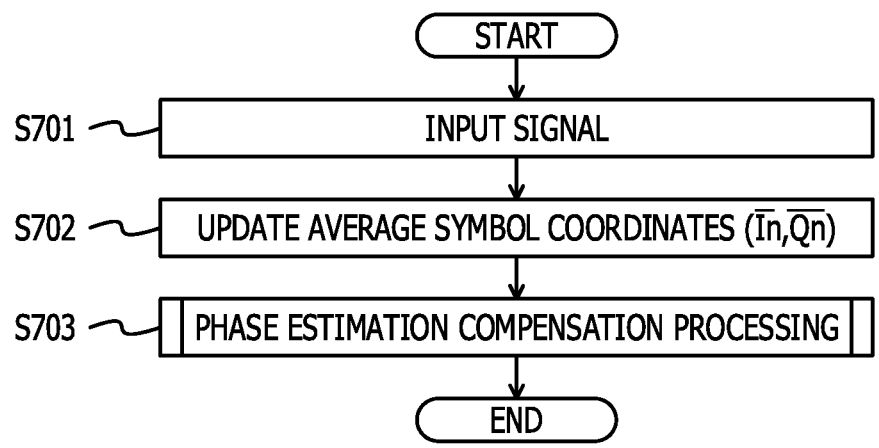
FIG. 7 is a flow chart illustrating an example of receiving processing that is performed by a receiving device.

FIG. 7 is a flow chart illustrating an example of receiving processing that is performed by a receiving device. As illustrated in FIG. 7, the receiving device 120 inputs a signal received from the transmission device 110 (Step S701). Next, the receiving device 120 updates average symbol coordinates from the positions of symbol coordinates observed in each quadrant (Step S702). The average symbol coordinates may be calculated using Expressions 1 to 4 below.

$$I \geq 0, Q \geq 0 \Rightarrow ave(I'_{11}, I'_{12}, I'_{13}, I'_{14}, \ldots, I'_{1M}) = \bar{I}_1, \quad (1)$$
$$ave(Q'_{11}, Q'_{12}, Q'_{13}, Q'_{14}, \ldots, Q'_{1M}) = \bar{Q}_1$$

$$I < 0, Q \geq 0 \Rightarrow ave(I'_{21}, I'_{22}, I'_{23}, I'_{24}, \ldots, I'_{2M}) = \bar{I}_2, \quad (2)$$
$$ave(Q'_{21}, Q'_{22}, Q'_{23}, Q'_{24}, \ldots, Q'_{2M}) = \bar{Q}_2$$

$$I < 0, Q < 0 \Rightarrow ave(I'_{31}, I'_{32}, I'_{33}, I'_{34}, \ldots, I'_{3M}) = \bar{I}_3, \quad (3)$$
$$ave(Q'_{31}, Q'_{32}, Q'_{33}, Q'_{34}, \ldots, Q'_{3M}) = \bar{Q}_3$$

$$I \geq 0, Q < 0 \Rightarrow ave(I'_{41}, I'_{42}, I'_{43}, I'_{44}, \ldots, I'_{4M}) = \bar{I}_4, \quad (4)$$
$$ave(Q'_{41}, Q'_{42}, Q'_{43}, Q'_{44}, \ldots, Q'_{4M}) = \bar{Q}_4$$

Expressions 1 to 4 are calculation formulas used for obtaining average symbol coordinates from M pieces of symbol data which are held in the corresponding quadrant. Specifically, Expression 1 is a calculation formula for obtaining average symbol coordinates in the first quadrant. Expression 2 is a calculation formula for obtaining average symbol coordinates in the second quadrant. Expression 3 is a calculation formula for obtaining average symbol coordinates in the third quadrant. Expression 4 is a calculation formula for obtaining average symbol coordinates in the fourth quadrant.

As described above, the receiving device 120 may obtain average symbol coordinates of symbol coordinates of a certain number (corresponding to a certain period or a certain amount) for each of the first to fourth quadrants. Then, the receiving device 120 performs phase estimation compensation processing (see FIG. 8) in order to correct the direction of a trapezoid indicated by the symbol shape on the constellation (Step S703), and ends receiving processing.

(Phase Estimation Compensation Processing that is Performed by Receiving Device)

Figure 8:
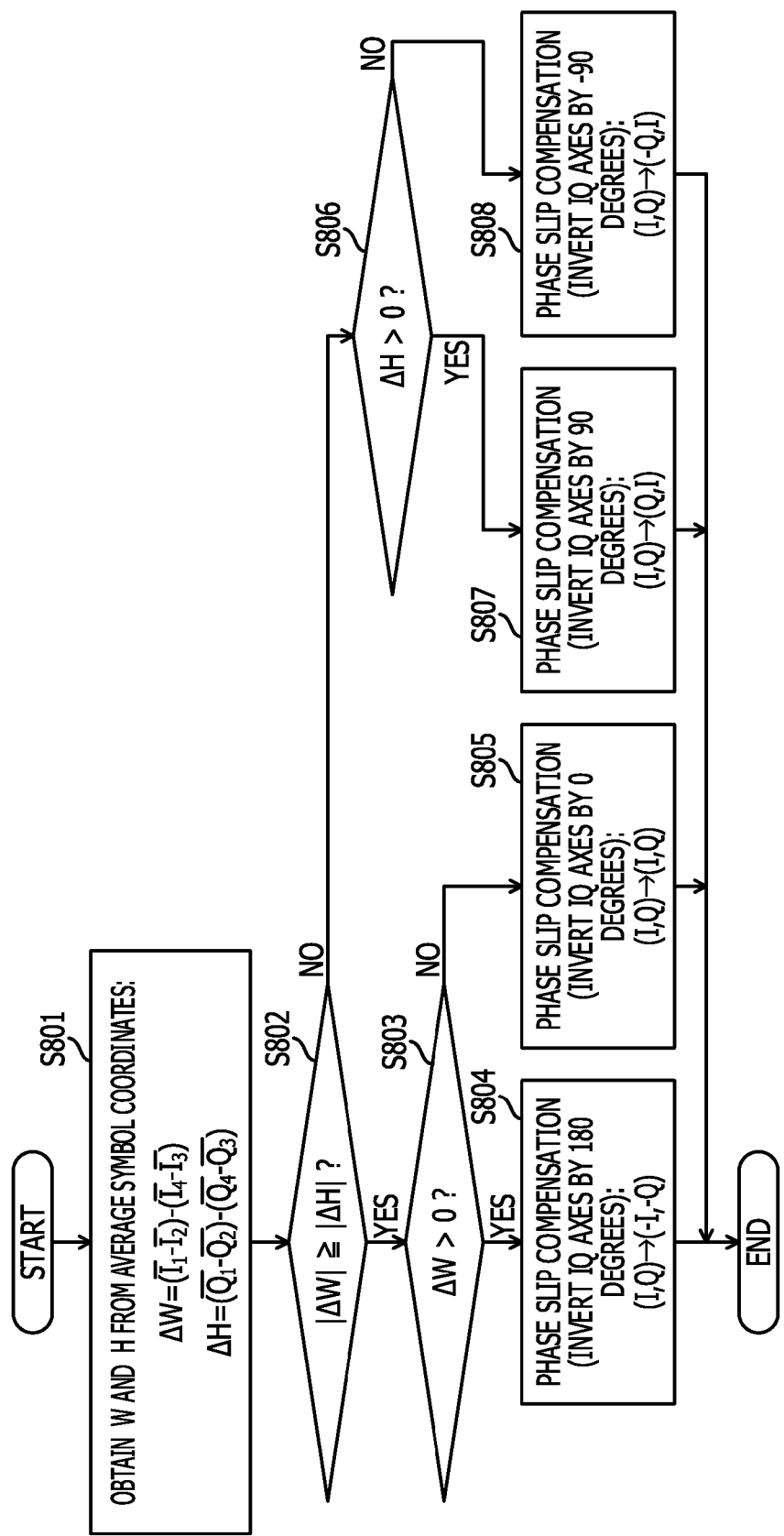
FIG. 8 is a flow chart illustrating an example of a phase estimation compensation processing performed by a receiving device.

FIG. 8 is a flow chart illustrating an example of a phase estimation compensation processing that is performed by a receiving device. In FIG. 8, the receiving device 120 calculates ΔW, which represents a difference in length in the I axis direction, and ΔH, which represents a difference in length in the Q axis direction for the symbol shape on the constellation using average symbol coordinates of each of the first to fourth quadrants that have been calculated (updated) in Step S702 of FIG. 7 (Step S801).

In the first embodiment, the symbol shapes formed by the symbol coordinates indicate isosceles trapezoidal shapes having different directions, and therefore, it may be determined that a trapezoid indicated by a symbol shape faces right or left, when the value of ΔW is close to 0. It may be determined that a trapezoid indicated by a symbol shape faces upward or downward, when the value of ΔH is close to 0. It may be determined that a trapezoid indicated by a symbol shape faces upward or downward, depending on whether the value of ΔW is positive or negative. It may be determined that a trapezoid indicated by a symbol shape faces left or right, depending on whether the value of ΔH is positive or negative.

After Step S801, the receiving device 120 determines whether or not |ΔW|≥|ΔH| is satisfied (Step S802). If |ΔW|≥|ΔH| is satisfied (YES in Step S802), that is, if a trapezoid indicated by a symbol shape faces upward or downward, the receiving device 120 determines whether or not ΔW>0 is satisfied (Step S803). If ΔW>0 is satisfied (YES in Step S803), that is, if a trapezoid indicated by a symbol shape faces downward, the receiving device 120 performs phase slip compensation in which the IQ axes are inverted by 180 degrees (Step S804), and ends phase estimation compensation processing.

In Step S803, if ΔW>0 is not satisfied (NO in Step S803), that is, if a trapezoid indicated by a symbol shape faces upward, the receiving device 120 performs (0-degree inversion) phase slip compensation in which the IQ axes are left remaining in the same state (Step S805). Then, the receiving device 120 ends phase estimation compensation processing. In Step S802, if |ΔW|≥|ΔH| is not satisfied (NO in Step S802), that is, if a trapezoid indicated by a symbol shape faces right or left, whether or not ΔH>0 is satisfied is determined (Step S806).

If ΔH>0 is satisfied (YES in Step S806), that is, if a trapezoid indicated by a symbol shape faces left, the receiving device 120 performs phase slip compensation in which the IQ axes are inverted (are rotated to left) by 90 degrees (Step S807), and ends phase estimation compensation processing. In Step S806, if ΔH>0 is not satisfied (NO in Step S806), that is, if a trapezoid indicated by a symbol shape faces right, the receiving device 120 performs phase slip compensation in which the IQ axes are inverted (are rotated to right) by −90 degrees (Step S808). Thereafter, the receiving device 120 ends phase estimation compensation processing.

Note that, in Step S802, if there is almost no difference between |ΔW| and |ΔH|, if ΔW is close to 0 in Step S803, or if ΔH is close to 0 in Step S806, the receiving device 120 may determine indeterminable and hold. In this case, for example, a determinable result immediate before the above-described determination may be used. Also, in Step S803 or Step S806, in order to further increase accuracy, a threshold is provided such that the process proceeds to processing in which, if each of ΔW and ΔH is the corresponding threshold or more, an affirmative determination result is obtained, and if ΔW or ΔH is less than the threshold, the receiving device 120 may determine indeterminable and hold.

In the first embodiment, symbol mapping is performed such that a rotational asymmetrical shape, such as a trapezoid, is indicated and a signal is transmitted, and thus, determination of a phase slip is enabled at the receiving side, so that the phase may be estimated with high accuracy while reduction in data transmission capacity is reduced.

(Reduction in Influence of Distortion Due to Dynamic Range)

Next, reduction in influence of a distortion due to a dynamic range will be described. In hardware of the transmission device 110 and the receiving device 120, for example, a distortion of a dynamic range may occur. A distortion of a dynamic range is, for example, a distortion of a symbol shape caused by an error or the like.

In order to reduce this distortion, for example, the transmission device 110 transmits a signal in which the direction of a trapezoid indicated by a symbol shape is alternately inverted. The receiving device 120 may estimate the direction of a trapezoid on a constellation by detecting a difference between a state where the direction of the trapezoid on the constellation is inverted and a state where the direction of the trapezoid on the constellation is not inverted. A case where, in order to reduce an influence of a distortion due to a dynamic range, or the like, the direction of a trapezoid indicated by a symbol shape is inverted will be described in detail below.

(An Example of Step of Inverting Direction of Symbol Shape which is Performed by Transmission Device)

Figure 9:
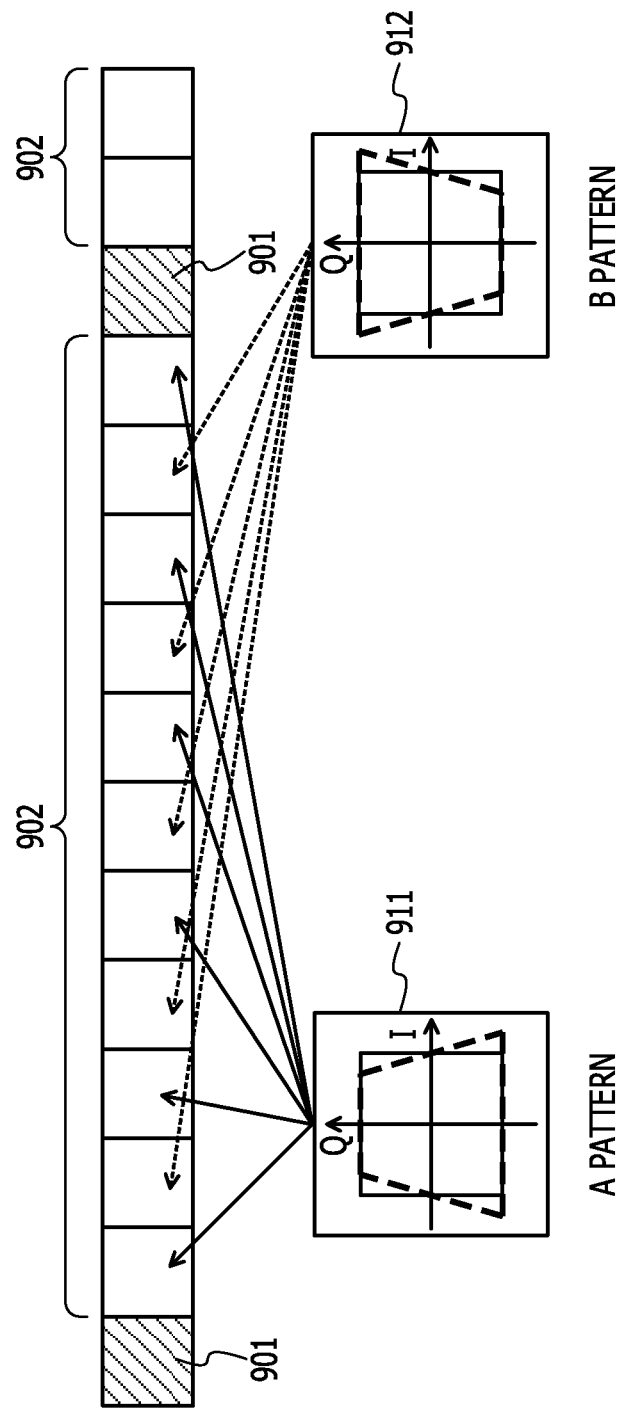
FIG. 9 is a diagram illustrating an example of a step of inverting the direction of a symbol shape which is performed by a transmission device.

FIG. 9 is a diagram illustrating an example of a step of inverting the direction of a symbol shape which is performed by a transmission device. As illustrated in FIG. 9, for example, assume that, after frame detection 901, there are a specific number of bits (signals) 902. The frame detection 901 is detection of a frame used for identifying the head of data. Note that it is not limited to the frame detection 901 that is detected but, for example, a control signal indicating a bit number arranged in the head of data may be detected in order to identify the head of data.

The transmission device 110 generates coordinates with which a trapezoid indicated by a symbol shape is alternately inverted for bits of a specific bit number after the frame detection 901. For example, in an A pattern 911 of a transmission pattern, symbol coordinates are arranged such that a trapezoid indicated by the symbol shape faces upward on a constellation. In a B pattern 912 of a transmission pattern, symbol coordinates are arranged such that a trapezoid indicated by the symbol shape faces downward on a constellation.

As described above, the transmission device 110 alternately switches the A pattern 911 and the B pattern 912 such that the A pattern 911→the B pattern 912→the A pattern 911→the B pattern 912→ . . . , and transmits signals. Also, if there is a next frame detection 901, the transmission device 110 alternately switches the A pattern 911 and the B pattern 912 for bits of the specific bit number such that the A pattern 911→the B pattern 912→the A pattern 911→the B pattern 912→ . . . , and transmits signals. Note that the A pattern 911 and the B pattern 912 illustrated in FIG. 9 indicate a case where there is almost no distortion.

The receiving device 120 receives a signal of the A pattern 911 or the B pattern 912 from the transmission device 110. The receiving device 120 receives signals in the order of the A pattern 911→the B pattern 912→the A pattern 911→the B pattern 912→ . . . using the frame detection 901 as a reference. A step of calculating correction symbol coordinates which is performed by the receiving device 120, will be described below.

(An Example of Method for Obtaining Correction Symbol Coordinates which is Performed by Receiving Device)

Figure 10:
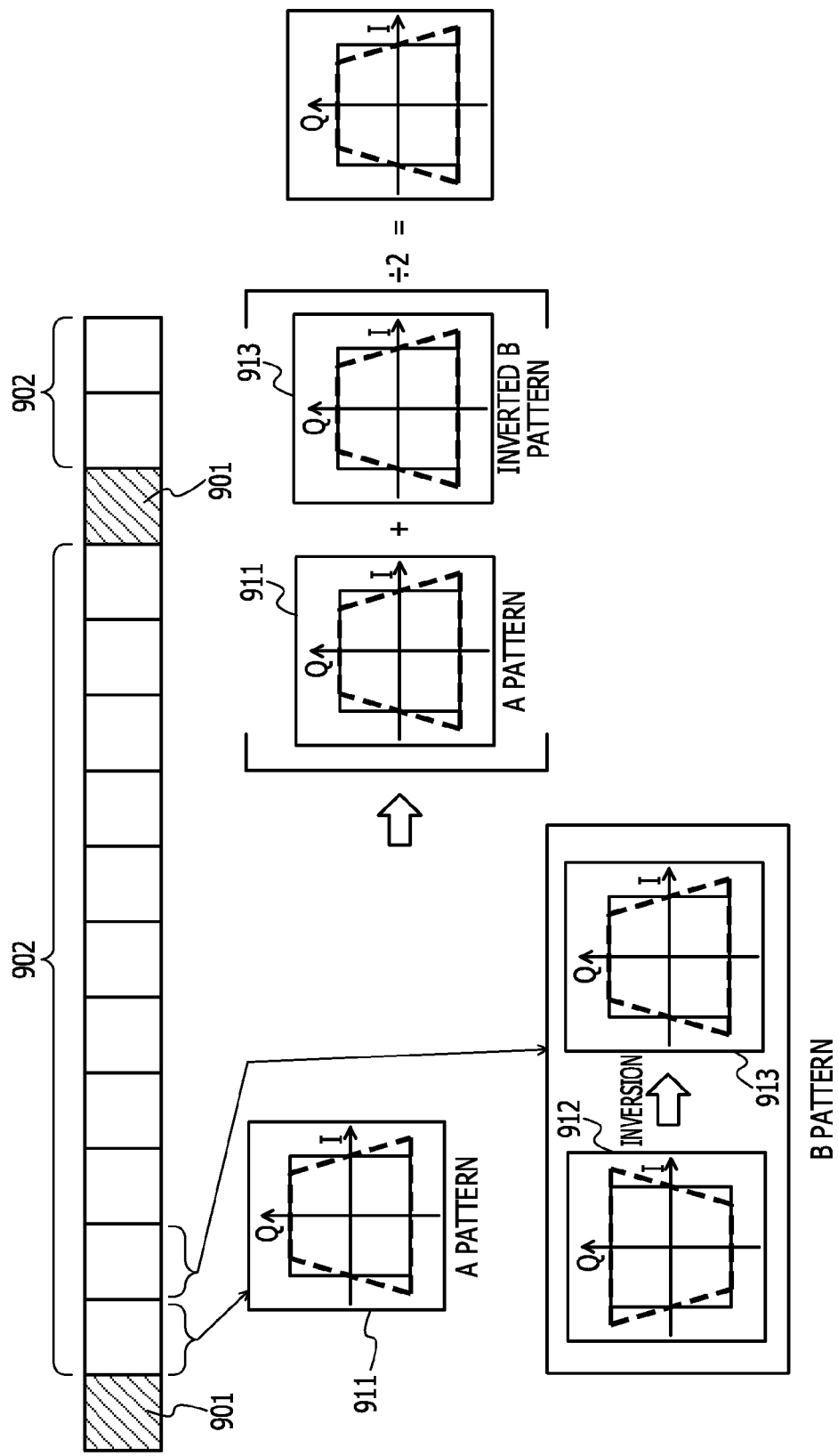
FIG. 10 is a diagram illustrating an example of a method for obtaining correction symbol coordinates which is performed by a receiving device.

FIG. 10 is a diagram illustrating an example of a method for obtaining correction symbol coordinates which is performed by a receiving device. Note that, in FIG. 10, a case corresponding to FIG. 9 where there is almost no distortion of a constellation is illustrated. In FIG. 10, the receiving device 120 may alternately detect the A pattern 911 or the B pattern 912 in accordance with the frame detection 901.

The receiving device 120 leaves the A pattern 911 remaining in the same state and performs inversion processing for the B pattern 912, thereby, for example, inverting the symbol coordinates by 180 degrees. Then, an average of the A pattern 911 and the inverted B pattern 913 is calculated, thereby obtaining correction symbol coordinates. The average of the A pattern 911 and the inverted B pattern 913 is obtained, for example, by adding the symbol coordinates of the A pattern 911 and the inverted B pattern 913 together and dividing the obtained value by two.

(An Example of Method for Obtaining Correction Symbol Coordinates when Symbol Shape is Distorted in Specific Direction)

Figure 11:
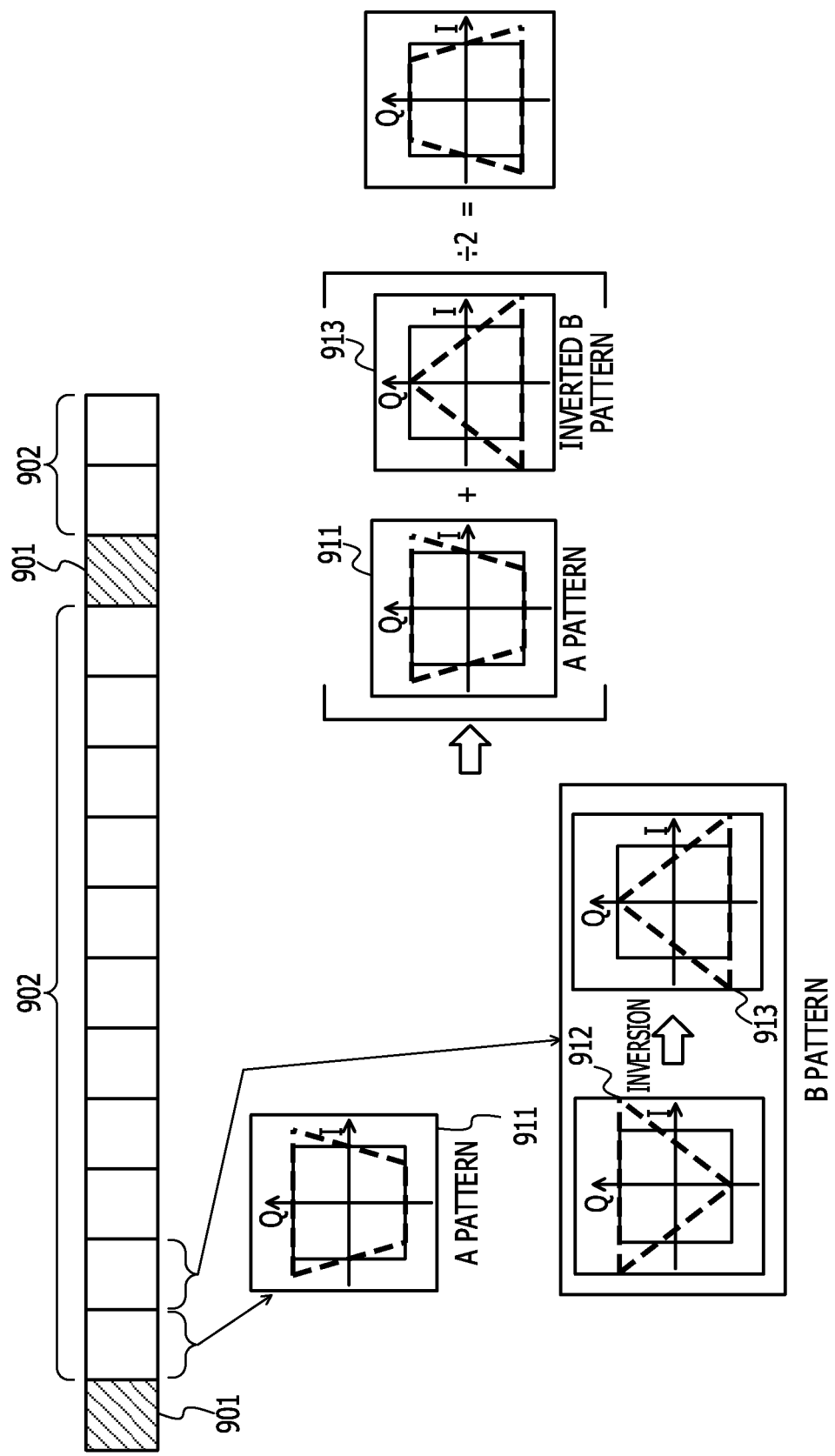
FIG. 11 is a diagram illustrating an example of a method for obtaining correction symbol coordinates which is performed when a symbol shape is distorted in a specific direction.

FIG. 11 is a diagram illustrating an example of a method for obtaining correction symbol coordinates which is performed when a symbol shape is distorted in a specific direction. A step itself of calculating correction symbol coordinates illustrated in FIG. 11 is the same as a step of calculating correction symbol coordinates illustrated in FIG. 10. In an example illustrated in FIG. 11, the shape of a constellation is different from that of an example illustrated in FIG. 10.

In FIG. 11, the A pattern 911 indicates a case where, in the transmission device 110, symbol coordinates are generated such that a trapezoid indicated by a symbol shape faces upward but, in the receiving device 120, a trapezoid illustrated by a symbol shape faces downward due to a distortion. That is, a case where a distortion has occurred in a direction that cancels a trapezoidal shape is illustrated.

The B pattern 912 indicates a case where, in the transmission device 110, symbol coordinates are generated such that a trapezoid indicated by a symbol shape faces downward but, in the receiving device 120, a trapezoid indicated by a symbol shape is a shape close to an upside-down triangle due to a distortion. That is, a case where a distortion has occurred in a direction that further emphasizes a trapezoidal shape is illustrated.

The receiving device 120 leaves the A pattern 911 remaining in the same state and inverts symbol coordinates by 180 degrees for the B pattern 912. Then, an average of the A pattern 911 and the inverted B pattern 913 is obtained, thereby obtaining correction symbol coordinates. As described above, even when a distortion has occurred in a specific direction, an action of a distortion may be cancelled and a symbol shape when there is not a distortion may be obtained by obtaining the average of the A pattern 911 and the inverted B pattern 913.

Thus, although the trapezoid indicated by the symbol shape faces downward for the A pattern 911, the receiving device 120 may determine that symbol mapping of the symbol shape in which the trapezoid indicated by the symbol shape is made to face upward has been performed in the transmission device 110. Also, although the trapezoid indicated by the symbol shape is a shape close to an upside-down triangle for the B pattern 912, the receiving device 120 may determine that symbol mapping in which the trapezoid indicated by the symbol shape is made to face downward has been performed in the transmission device 110.

As described above, signals are received in the order of the A pattern 911→the B pattern 912→ . . . , and an average of the A pattern 911 and the inverted B pattern 913 is calculated, so that an action of a distortion may be cancelled. Therefore, the phase may be estimated in consideration of a distortion. Processing of inverting the direction of a trapezoid indicated by a symbol shape will be described below.

(Transmission Processing that is Performed when Direction of Trapezoid Indicated by Symbol Shape)

Figure 12:
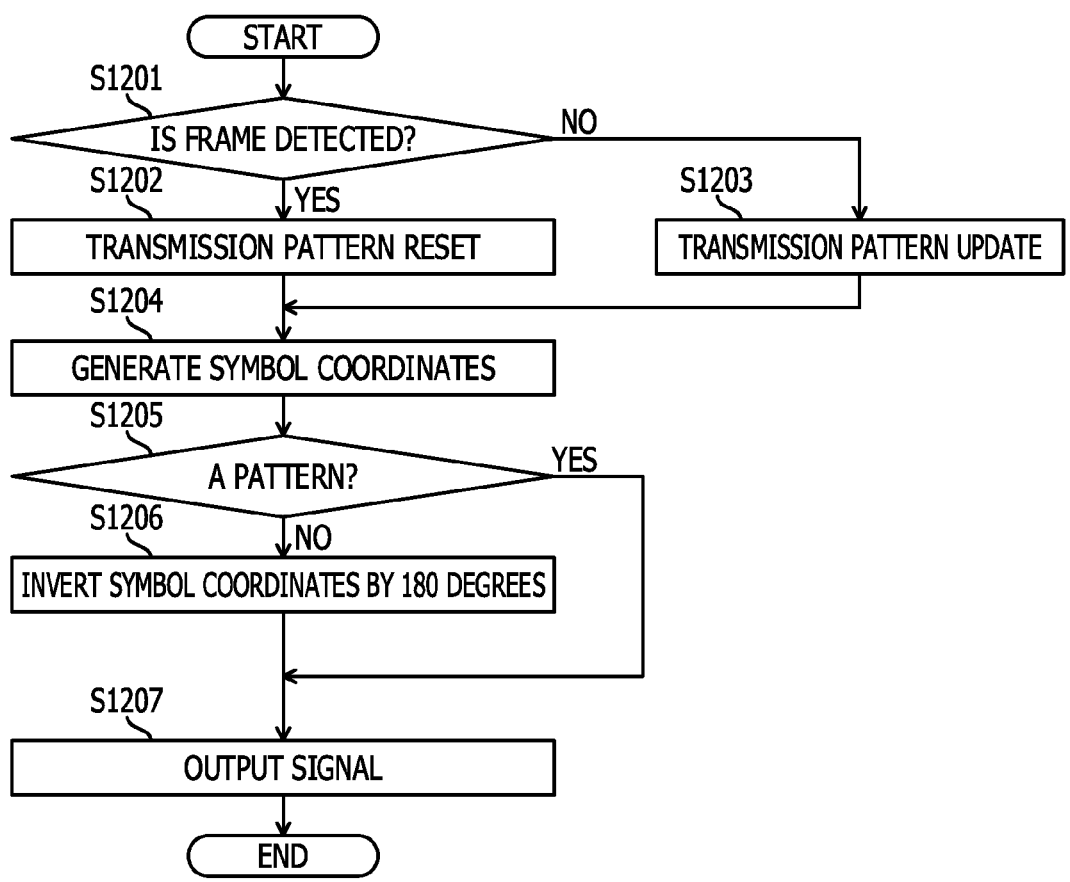
FIG. 12 is a flow chart illustrating an example of transmission processing that is performed when the direction of a trapezoid indicated by a symbol shape.

FIG. 12 is a flow chart illustrating an example of transmission processing that is performed when the direction of a trapezoid indicated by a symbol shape. As illustrated in FIG. 12, the transmission device 110 determines whether or not there was frame detection (Step S1201). If there was frame detection (YES in Step S1201), the transmission device 110 resets a transmission pattern (Step S1202), and the process proceeds to Step S1204. To reset a transmission pattern is to make the order of subsequent transmission patterns the order of the A pattern 911 (see FIG. 9)→the B pattern 912→the A pattern 911→ . . . to make the next transmission pattern the A pattern 911.

If there was not frame detection (NO in Step S1201), the transmission device 110 updates the transmission pattern (Step S1203). In Step S1203, the transmission device 110 updates, if the previous transmission pattern is the A pattern 911, the transmission pattern to the B pattern 912, and updates, if the previous transmission pattern is the B pattern 912, the transmission pattern to the A pattern 911.

Then, the transmission device 110 generates symbol coordinates (Step S1204). Next, the transmission device 110 determines whether or not the transmission pattern is the A pattern 911 (Step S1205). If the transmission pattern is the A pattern (YES in Step S1205), the transmission device 110 makes the process proceed to Step S1207. If the transmission pattern is not the A pattern (NO in Step S1205), the transmission device 110 inverts the generated symbol coordinates by 180 degrees (Step S1206). Then, the transmission device 110 outputs a signal based on the generated symbol coordinates in order to transmit the signal to the receiving device 120 (Step S1207), and ends transmission processing.

(Processing of Calculating Correction Symbol Coordinates which is Performed by Receiving Device)

Figure 13:
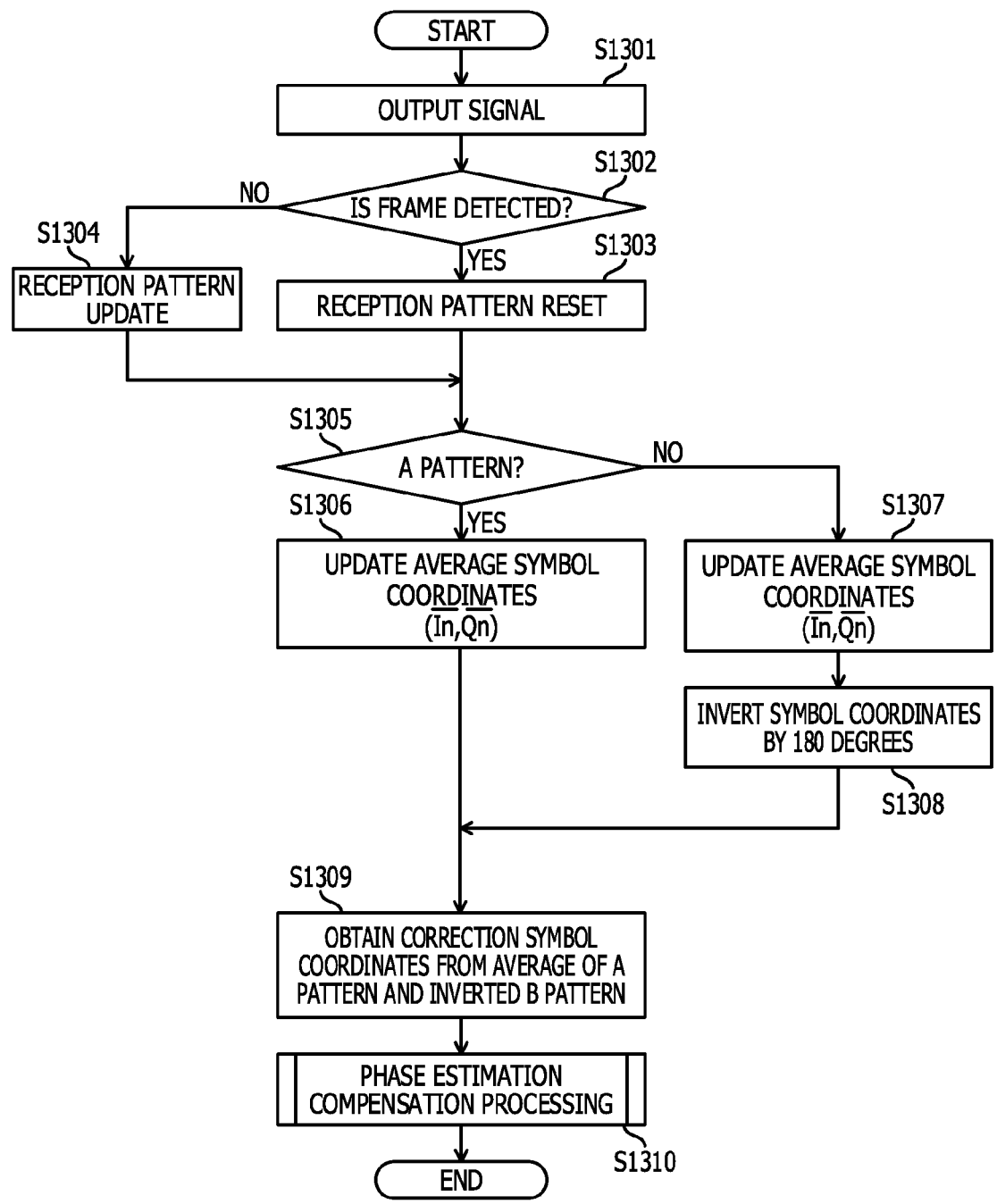
FIG. 13 is a flow chart illustrating an example of processing of calculating correction symbol coordinates which is performed by a receiving device.

FIG. 13 is a flow chart illustrating an example of processing of calculating correction symbol coordinates which is performed by a receiving device. As illustrated in FIG. 13, the receiving device 120 inputs a signal received from the transmission device 110 (Step S1301). Then, the receiving device 120 determines whether or not there was frame detection (Step S1302). If there was frame detection (YES in Step S1302), the receiving device 120 resets the reception pattern (Step S1303), and makes the process proceed to Step S1305. To reset the reception pattern is to make the order of reception patterns that are subsequently received the order of the A pattern 911 (see FIG. 10)→the B pattern 912→the A pattern 911→ . . . to make the next reception pattern the A pattern 911.

If there was not frame detection (NO in Step S1302), the receiving device 120 updates the reception pattern (Step S1304). In Step S1304, the receiving device 120 updates, if the previous reception pattern is the A pattern 911, the reception pattern to the B pattern 912, and updates, if the previous pattern is the B pattern 912, the reception pattern to the A pattern 911.

Next, the receiving device 120 determines whether or not the received signal is the A pattern 911 (Step S1305). If the received signal is the A pattern 911 (YES in Step S1305), the receiving device 120 updates the average symbol coordinates from symbol coordinates observed for each quadrant (Step S1306), and makes the process proceed to Step S1309. The average symbol coordinates may be calculated using Expressions 1 to 4 described above.

In Step S1305, if a determination pattern is not the A pattern 911 (NO in Step S1305), that is, if the determination pattern is the B pattern 912, the receiving device 120 updates average symbol coordinates from the positions of symbol coordinates observed for each quadrant (Step S1307). The average symbol coordinates may be calculated using Expression 1 to 4 described above. The receiving device 120 inverts the symbol coordinates by 180 degrees (Step S1308).

Next, the receiving device 120 obtains correction symbol coordinates from the average of the A pattern 911 and the inverted B pattern 913 (see FIG. 10) (Step S1309). Then, the receiving device 120 performs phase estimation compensation processing (see FIG. 8) using the obtained correction symbol coordinates as average symbol coordinates (Step S1310), and ends a series of processing in accordance with this flow chart.

As described above, a difference between a state where the direction of a trapezoid indicated by a symbol shape on a constellation is inverted and a state where the direction of the trapezoid is not inverted, so that the direction of a trapezoid indicated by a symbol shape may be estimated and the phase may be estimated in consideration of a distortion.

(An Example of Case where Phase Slip is Compensated Using Pilot Signal)

A configuration in which symbol coordinates are generated such that a symbol shape is a regular tetragonal shape on a constellation and a phase slip is compensated using a pilot signal will be hereinafter described.

Figure 14:
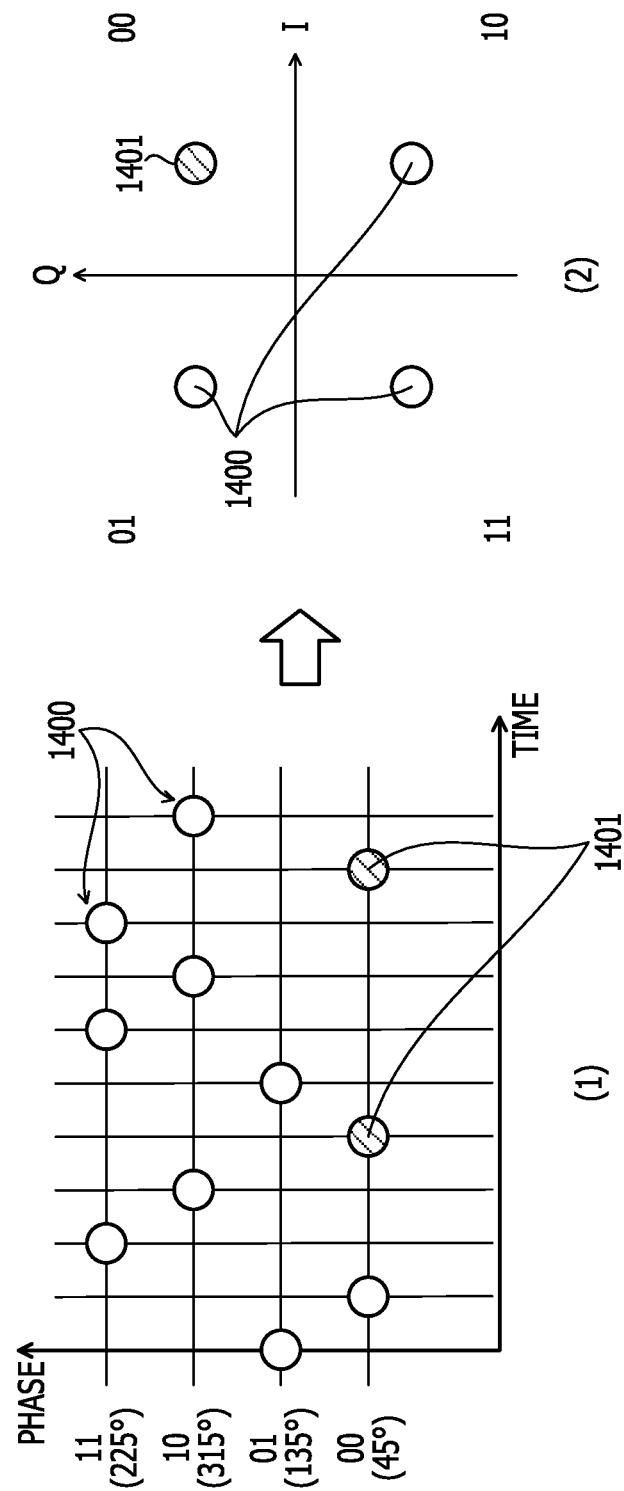
FIG. 14 is a diagram illustrating an example of a case where phase estimation is performed using a pilot signal.

FIG. 14 is a diagram illustrating an example of a case where phase estimation is performed using a pilot signal. In (1) of FIG. 14, the abscissa indicates time and the ordinate indicates phase. Each of the positions of symbol coordinates 1400 indicates one of 45 degrees, 135 degrees, 225 degrees, and 315 degrees, and is represented by two bits (four values). In (1) of FIG. 14, it is illustrated that a signal of 01, a signal of 00, a signal of 11, and a signal of 10 are sequentially transmitted as time passes.

Also, the transmission device 110 transmits a pilot signal 1401 to the receiving device 120 with a predetermined timing that has been determined in advance. The pilot signal 1401 is a signal that indicates the phase serving as a reference. Also, the predetermined timing with which the pilot signal 1401 is transmitted is known at the receiving device 120 side.

The transmission device 110 transmits, for example, the pilot signal 1401 of a value (00=45 degrees) determined by a cycle that has been determined in advance. As illustrated in (2) of FIG. 14, the receiving device 120 may estimate the phases of a plurality of symbol coordinates 1400 may be estimated using the pilot signal 1401 as a reference.

In this case, the pilot signal 1401 uses a part of the time area of a transmission rate. Therefore, when the ratio of the pilot signal 1401 is increased, the utilization efficiency of a band is reduced by a corresponding amount, that is, the data transmission capacity is reduced. Also, when the ratio of the pilot signal 1401 is reduced, reliability of detection of a phase slip is reduced, error occurrence probability of a burst error in which an error occurs in data increases, and signal quality is degraded.

In contrast, in the first embodiment, it is possible to determine a phase slip at the receiving side even without using a pilot signal that causes reduction in utilization efficiency of a band, and therefore, the band may be maximally used and the phase may be estimated with high accuracy while reduction in data transmission capacity is reduced.

Note that, in the first embodiment, a symbol shape is a shape that does not have the same symbol shape while rotating one revolution, centering around the origin on a constellation, but may be a shape that does not have the same symbol shape while rotating by 0 to 180 degrees. For example, the symbol shape may be a rectangular shape. In accordance with this, a phase on the constellation is adjusted with an angle of 0 degrees or 180 degrees using a control signal (for example, a pilot signal).

Thus, in the receiving device 120, whether the direction indicated by a rectangle is horizontal or vertical may be determined. With such a configuration, the amount of the control signal may be reduced. Therefore, the phase may be estimated with high accuracy while reduction in data transmission capacity is reduced.

(Second Embodiment)

Next, a second embodiment will be described. The second embodiment is different from the first embodiment in that the positions of symbol coordinates that characterize a symbol shape are different from those in the first embodiment. Specifically, in the second embodiment, a case where symbol coordinates are generated such that, for one of four points of the symbol coordinates, a distance from the orthogonal coordinates (the origin) of the I axis and the Q axis is different from those of the other three points will be described.

(An Example of Reception Pattern that is Received by Receiving Device in Second Embodiment)

Figure 15:
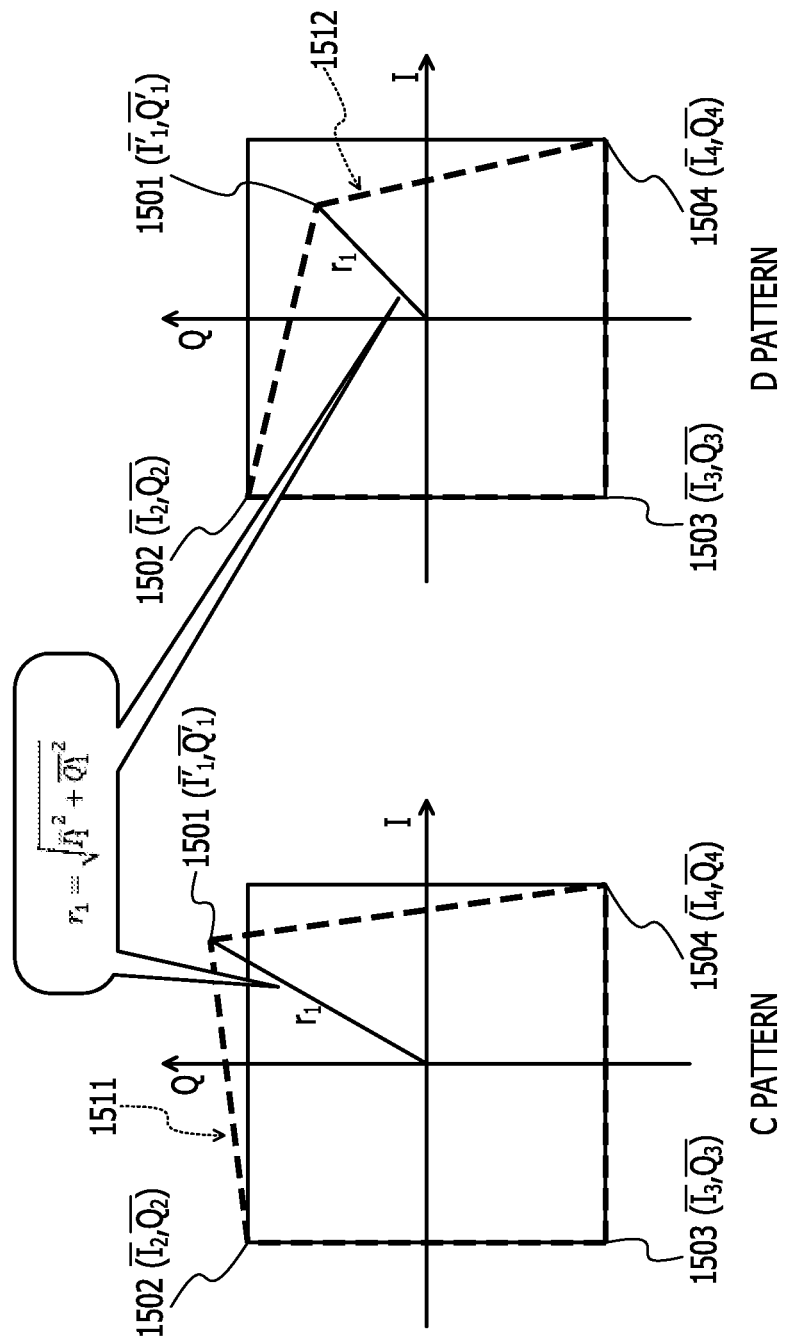
FIG. 15 is a diagram illustrating an example of a reception pattern that is received by a receiving device according to a second embodiment.

FIG. 15 is a diagram illustrating an example of a reception pattern that is received by a receiving device according to a second embodiment. In FIG. 15, the abscissa indicates an I component and the ordinate indicates a Q component. Each of symbol coordinates 1501 to 1504 represents an average of symbol coordinates accumulated during a certain period. Note that, as a precondition to reception of signals based on the symbol coordinates 1501 to 1504 by the receiving device 120, a signal with which symbol coordinates are generated at the same positions as those of the symbol coordinates 1501 to 1504 in the transmission device 110 is transmitted.

For example, in a C pattern 1511, a distance $r_1$ from the orthogonal coordinates of the I axis and the Q axis to the symbol coordinates 1501 is longer than a distance of any of the other symbol coordinates 1502 to 1504 from the origin. Thus, the symbol shape may be made to have a rotational asymmetry property by making, for one of the four points of the symbol coordinates, the distance from the orthogonal coordinates of the I axis and the Q axis longer than those of the other three points. Therefore, which direction among the upward, downward, left, and right directions, the symbol shape indicates may be determined.

The reception pattern is not limited to the C pattern 1511 but may be a D pattern 1512. In the D pattern 1512, the distance $r_1$ from the orthogonal coordinates of the I axis and the Q axis is shorter than the distance of any of the other symbol coordinates 1502 to 1504 from the origin. Thus, the symbol shape may be made to have a rotational asymmetry property by making, for one of the four points of the symbol coordinates, the distance from the orthogonal coordinates of the I axis and the Q axis shorter than those of the other three points. Therefore, which direction among the upward, downward, left, and right directions the symbol shape indicates may be determined.

For example, as illustrated in FIG. 15, the direction indicated by the symbol shape when the distance $r_1$ from the origin to the symbol coordinates 1501 located in the first quadrant is made different from each of the distances of the other symbol coordinates 1502 to 1504 from the origin is a reference direction. For example, in the reception pattern in the receiving device 120, if the symbol coordinates located at the distance $r_1$ from the origin are observed in the third quadrant, it is determined that the symbol shape is rotated by 180 degrees. In this case, the receiving device 120 performs phase slip compensation in which the symbol shape is rotated by 180 degrees or phase slip compensation in which the I axis and the Q axis are rotated by 180 degrees.

In the second embodiment, the symbol shape is determined by making, for one of the four points of the symbol coordinates, the distance from the origin different from those of the other three points and comparing the distances from the origin to the symbol coordinates to one another, and thus, the direction indicated by the symbol shape may be estimated by simple processing.

(Transmission Processing that is Performed by Transmission Device According to Second Embodiment)

Figure 16:
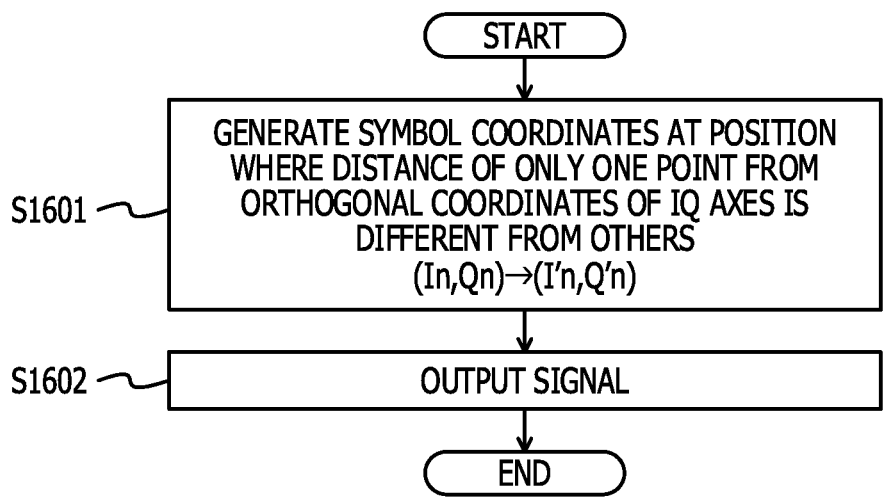
FIG. 16 is a flow chart illustrating transmission processing that is performed by a transmission device according to the second embodiment.

FIG. 16 is a flow chart illustrating transmission processing that is performed by a transmission device according to the second embodiment. As illustrated in FIG. 16, the transmission device 110 generates symbol coordinates at a position where, for one of the four points of the symbol coordinates, the distance from the orthogonal coordinates of the I axis and the Q axis is different from those of the other three points (Step S1601). For example, the transmission device 110 generates coordinates that form the C pattern 1511 (see FIG. 15). Then, the transmission device 110 outputs a signal based on information of the generated coordinates in order to transmit the signal to the receiving device 120 (Step S1602), and ends transmission processing.

(Phase Estimation Compensation Processing that is Performed by Receiving Device According to Second Embodiment)

Figure 17:
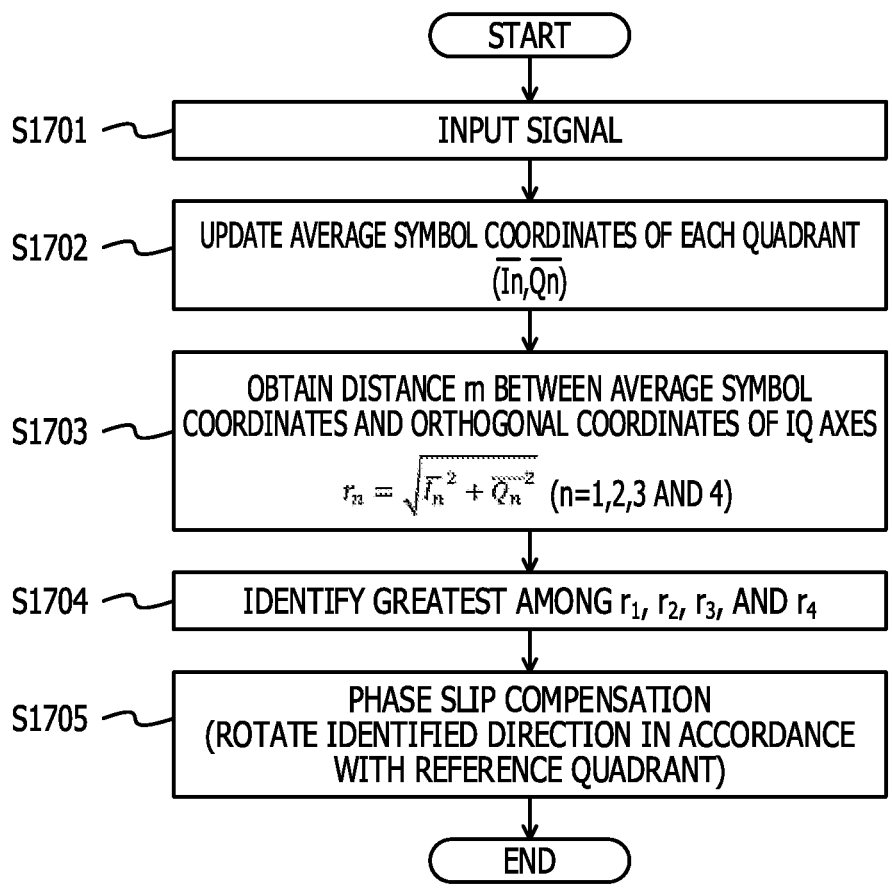
FIG. 17 is a flow chart illustrating an example of phase estimation compensation processing that is performed by a receiving device according to the second embodiment.

FIG. 17 is a flow chart illustrating an example of phase estimation compensation processing that is performed by a receiving device according to the second embodiment. As illustrated in FIG. 17, the receiving device 120 inputs a signal received from the transmission device 110 (Step S1701). Next, the receiving device 120 updates average symbol coordinates of each quadrant using the symbol coordinates observed for the quadrant (Step S1702). The average symbol coordinates may be calculated using Expressions 1 to 4 described above.

Then, the receiving device 120 obtains a distance $r_n$ (n=1, 2, 3, and 4) from the orthogonal coordinates of the I axis and the Q axis for the average symbol coordinates of each quadrant (Step S1703). Next, the receiving device 120 identifies the greatest among the distances $r_n$ that have been obtained (Step S1704). Note that, if a signal in which the reception pattern is the D pattern 1512 (see FIG. 15) is received, the smallest among the distances $r_n$ may be identified in Step S1704.

Then, the receiving device 120 performs phase slip compensation in which symbol coordinates are rotated such that the direction obtained from the identified distance $r_n$ is a reference quadrant (for example, the first quadrant) (Step S1705), and ends phase estimation compensation processing.

According to the second embodiment, it is enabled to estimate the direction indicated by the symbol shape, and the phase may be estimated with high accuracy while reduction in data transmission capacity is reduced.

(Modified Examples of First and Second Embodiments)

Next, modified examples of the first and second embodiments will be described. Modified first and second modified examples are different from the first and second embodiments in that a QAM modulation method is used.

(First Modified Example)

Figure 18:
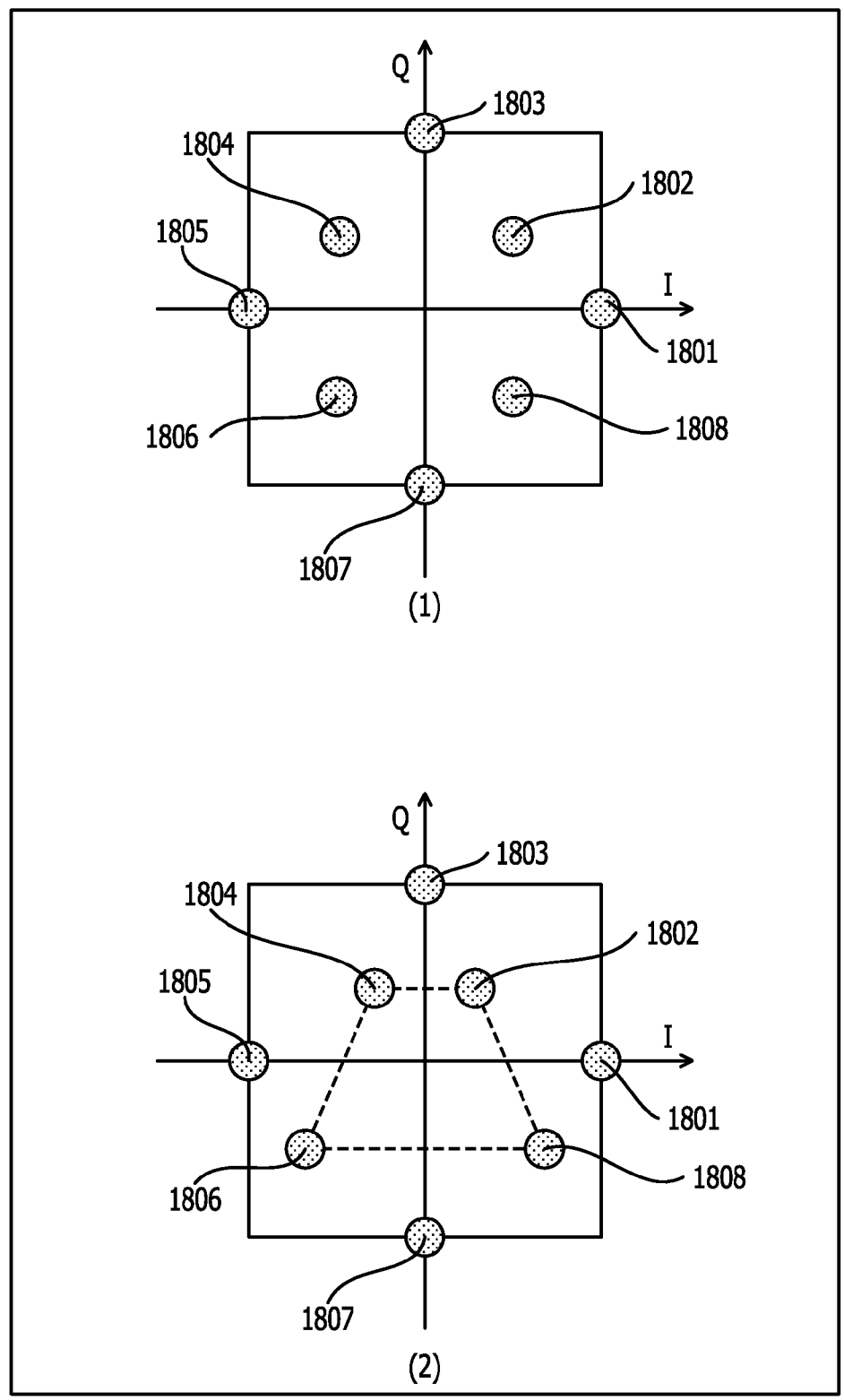
FIG. 18 is a diagram illustrating a constellation when a modulation method is 8 QAM.

FIG. 18 is a diagram illustrating a constellation when a modulation method is 8 QAM. In FIG. 18, the abscissa indicates an I component and the ordinate indicates a Q component. As illustrated in (1), in 8 QAM, for example, eight points of symbol coordinates 1801 to 1808 that characterize a regular tetragonal symbol shape, centering around the origin, are arranged. In the first modified example, as illustrated in (2), among the eight points of symbol coordinates 1801 to 1808, four points of the symbol coordinates 1802, 1804, 1806, and 1808, are arranged for example, such that a symbol shape on a constellation is a trapezoidal shape.

Specifically, the transmission device 110 arranges symbol coordinates such that the symbol coordinates 1802 and 1804 are located closer to the Q axis, as compared to the corresponding point of (1). Also, the transmission device 110 arranges symbol coordinates such that the symbol coordinates 1806 and 1808 are located at positions in the direction that is more distant from the Q axis, as compared to the corresponding points of (1).

Then, the receiving device 120 may determine which direction a trapezoid indicated by the symbol shape faces by calculating the average symbol coordinates of the symbol coordinates 1802, 1804, 1806, and 1808, and performing phase estimation compensation processing (see FIG. 8). Thus, the receiving device 120 may estimate the phase of a transmission signal with high accuracy while reduction in data transmission capacity is reduced.

Note that, in FIG. 18, a case where the four points of symbol coordinates 1802, 1804, 1806, and 1808 are arranged into a trapezoidal shape is described, but the arrangement of symbol coordinates is not limited thereto. For example, one of the eight points of symbol coordinates 1801 to 1808 may be arranged so as to be closer to or more distant from the orthogonal coordinates of the I axis and the Q axis, as compared to the other seven.

For example, an I axis coordinate of the symbol coordinates 1801 may be arranged at the further right side in FIG. 18 (that is, in a direction in which the distance from the orthogonal coordinates of the I axis and the Q axis increases), the greatest of the distances $r_n$ may be identified in phase estimation compensation processing (see FIG. 17), and thus, phase slip compensation may be performed. Also, for example, the symbol coordinates 1802 may be arranged so as to be closer to the orthogonal coordinates of the I axis and the Q axis, as compared to the other seven symbol coordinates 1801 and 1803 to 1808, the smallest of the distances $r_n$ may be identified in phase estimation compensation processing (see FIG. 17), and thus, phase slip compensation may be performed.

(Second Modified Example)

Figure 19:
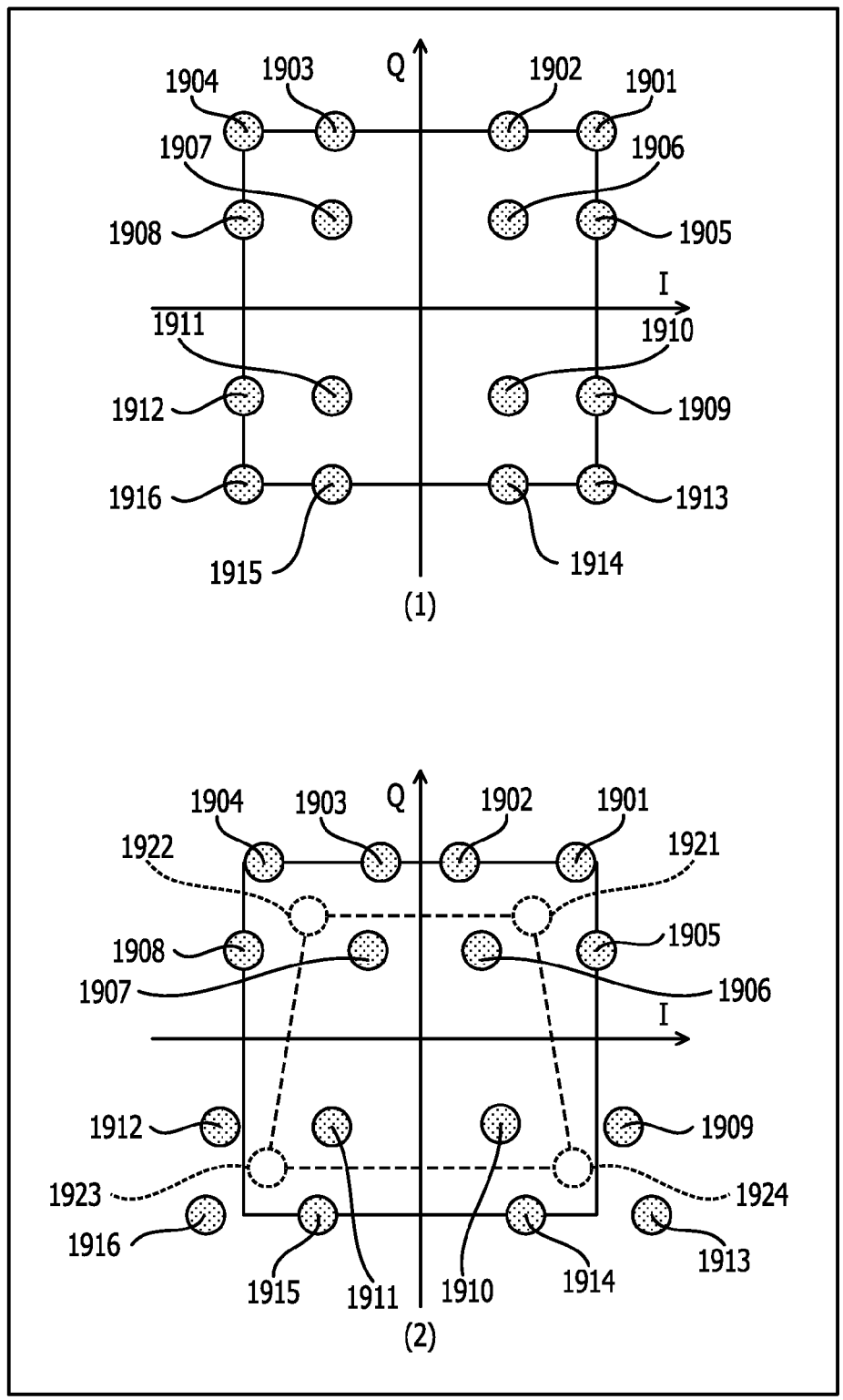
FIG. 19 is a diagram illustrating a constellation when a modulation method is 16 QAM.

FIG. 19 is a diagram illustrating a constellation when a modulation method is 16 QAM. In FIG. 19, the abscissa indicates an I component and the ordinate indicates a Q component. As illustrated in (1), in 16 QAM, for example, sixteen points of symbol coordinates 1901 to 1916 that characterize a regular tetragonal symbol shape, centering around the origin, are arranged. In the second modified example, as illustrated in (2), the sixteen points of symbol coordinates 1901 to 1916 are arranged, for example, such that a symbol shape on a constellation is a trapezoidal shape.

Specifically, the transmission device 110 generates coordinates such that an isosceles trapezoidal shape vertexes of which are the points of the symbol coordinates 1901, 1904, 1913, and 1916 is indicated. More specifically, the transmission device 110 arranges the four points of the symbol coordinates 1901 to 1904 so as to be located closer to the Q axis, as compared to those in (1). Also, the transmission device 110 arranges the four points of the symbol coordinates 1905 to 1908 so as to be located at the same positions as those in (1).

The transmission device 110 arranges the four points of the symbol coordinates 1909 to 1912 so as to be located at positions more distant from the Q axis, as compared to those in (1). Also, the transmission device 110 arranges the four points of the symbol coordinates 1913 to 1916 so as to be located at positions further more distant from the Q axis, as compared to the symbol coordinates 1909 to 1912.

The receiving device 120 calculates an average position for each quadrant. For example, for the first quadrant, average coordinates 1921 of the symbol coordinates 1901, 1902, 1905, and 1906 are calculated. For the second quadrant, average coordinates 1922 of the symbol coordinates 1903, 1904, 1907, and 1908 are calculated. For the third quadrant, average coordinates 1923 of the symbol coordinates 1911, 1912, 1915, and 1916 are calculated. For the fourth quadrant, average coordinates 1924 of the symbol coordinates 1909, 1910, 1913, and 1914 are calculated.

A trapezoidal symbol shape is characterized by the average coordinates 1921 to 1924 of the quadrants, which have been calculated. Assuming that the average coordinates 1921 to 1924 of the quadrants, which have been calculated, are average coordinates, the receiving device 120 performs phase estimation compensation processing (see FIG. 8), and thus, which direction a trapezoid faces on a constellation may be determined. Thus, the receiving device 120 may estimate the phase of a transmission signal with high accuracy while reduction in data transmission capacity is reduced.

Note that, in FIG. 19, the symbol coordinates 1901 to 1916 illustrated in (1) are arranged into a trapezoidal shape, but the arrangement of the symbol coordinates 1901 to 1916 is not limited thereto. For example, one of the points of the symbol coordinates 1906, 1907, 1910, and 1911 arranged at an inner side that is located close to the orthogonal coordinates of the I axis and the Q axis may be arranged so as to be located closer to the orthogonal coordinates of the I axis and the Q axis than the other three. In this case, in phase estimation compensation processing (see FIG. 17), the smallest of the distances $r_n$ may be identified, and phase slip compensation may be performed.

Also, coordinates may be generated such that one of the points of the symbol coordinates 1901 to 1904, 1905, 1908, 1909, and 1912 to 1916 which are located at an outer side is located so as to be more distant from the orthogonal coordinates of the I axis and the Q axis than the other points of the symbol coordinates. In this case, in phase estimation compensation processing (see FIG. 17), the greatest of the distances $r_n$ may be identified, and phase slip compensation may be performed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication system comprising:
a transmission device that transmits a signal, based on a plurality of symbol coordinates on a constellation, which characterize a shape having a predetermined rotational asymmetrical shape; and
a receiving device that accumulates symbol coordinates on the constellation in the signal received from the transmission device and estimates a phase of the signal received from the transmission device, based on a difference between the direction of a shape characterized by the accumulated symbol coordinates and the direction of the predetermined shape,
wherein the receiving device calculates average symbol coordinates from accumulated symbol coordinates, calculates, based on the average symbol coordinates, a first difference in a first coordinate axis direction on the constellation and a second difference in a second axis direction on the constellation perpendicular to the first coordinate axis direction, and acquires the difference by comparing the first difference and the second difference,
wherein the receiving device acquires the first difference by a subtraction on a distance between the average symbol coordinate on a first quadrant of the constellation and the average symbol coordinate on a second quadrant of the constellation and a distance between the average symbol coordinate on a fourth quadrant of the constellation and the average symbol coordinate on a third quadrant of the constellation, and acquires the second difference by a subtraction on a distance between the average symbol coordinate on the first quadrant and the average symbol coordinate on the fourth quadrant and a distance between the average symbol coordinate on the second quadrant and the average symbol coordinate on the third quadrant.

2. The communication system according to claim 1, wherein the predetermined shape is a shape that does not have the same shape while rotating one revolution, centering around an origin on the constellation.

3. The communication system according to claim 2, wherein the direction of one of points of the plurality of symbol coordinates that characterize the predetermined shape from the origin on the constellation is different from that of a different one of the points of the plurality of symbol coordinates.

4. A communication system comprising:
a transmission device that transmits a signal, based on a plurality of symbol coordinates on a constellation, which characterize a shape having a predetermined rotational asymmetrical shape; and
a receiving device that accumulates symbol coordinates on the constellation in the signal received from the transmission device and estimates a phase of the signal received from the transmission device, based on a difference between the direction of a shape characterized by the accumulated symbol coordinates and the direction of the predetermined shape,
wherein, while the transmission device switches around between a first signal based on a first symbol coordinate group which includes the plurality of symbol coordinates, and a second signal based on a second symbol coordinate group obtained by rotating the first symbol coordinate group by a predetermined angle, centering around an origin on the constellation, the transmission device transmits the first signal and the second signal, and
the difference between the directions is a difference based on a third symbol coordinate group in the first signal received from the transmission device, a fourth symbol coordinate group in the second signal received from the transmission device, and the predetermined angle.

5. The communication system according to claim 4,
wherein the difference between the directions is a difference between the direction of a shape characterized by the third symbol coordinate group and the fourth symbol coordinate group at least one of which has been corrected based on the predetermined angle and the direction of the predetermined shape.

6. The communication system according to claim 1,
wherein the signal is a signal generated by modulation including at least phase modulation.

7. A receiving device comprising:
a receiver that receives, from a transmission device that transmits a signal, based on a plurality of symbol coordinates on a constellation, which characterize a shape having a predetermined rotational asymmetrical shape, the signal;
an accumulator that accumulates symbol coordinates on the constellation in the signal received by the receiver; and
an estimation circuitry configured to estimate a phase of the signal received from the transmission device, based on a difference between the direction of a shape characterized by the symbol coordinates accumulated by the accumulator and the direction of the predetermined shape,
wherein the estimation circuitry calculates average symbol coordinates from accumulated symbol coordinates, calculates, based on the average symbol coordinates, a first difference in a first coordinate axis direction on the constellation and a second difference in a second axis direction on the constellation perpendicular to the first coordinate axis direction, and acquires the difference by comparing the first difference and the second difference,
wherein the estimation circuitry acquires the first difference by a subtraction on a distance between the average symbol coordinate on a first quadrant of the constellation and the average symbol coordinate on a second quadrant of the constellation and a distance between the average symbol coordinate on a fourth quadrant of the constellation and the average symbol coordinate on a third quadrant of the constellation, and acquires the second difference by a subtraction on a distance between the average symbol coordinate on the first quadrant and the average symbol coordinate on the fourth quadrant and a distance between the average symbol coordinate on the second quadrant and the average symbol coordinate on the third quadrant.

8. A semiconductor device comprising:
an accumulator that accumulates symbol coordinates on a constellation in a signal, the signal being transmitted from a transmission device that transmits the signal, based on a plurality of symbol coordinates on a constellation, which characterize a shape having a predetermined rotational asymmetrical shape, and received by a receiver; and an estimation circuitry configured to estimate a phase of the signal received from the transmission device, based on a difference between the direction of a shape characterized by the symbol coordinates accumulated by the accumulator and the direction of the predetermined shape, wherein the estimation circuitry calculates average symbol coordinates from accumulated symbol coordinates, calculates, based on the average symbol coordinates, a first difference in a first coordinate axis direction on the constellation and a second difference in a second axis direction on the constellation perpendicular to the first coordinate axis direction, and acquires the difference by comparing the first difference and the second difference, wherein the estimation circuitry acquires the first difference by a subtraction on a distance between the average symbol coordinate on a first quadrant of the constellation and the average symbol coordinate on a second quadrant of the constellation and a distance between the average symbol coordinate on a fourth quadrant of the constellation and the average symbol coordinate on a third quadrant of the constellation, and acquires the second difference by a subtraction on a distance between the average symbol coordinate on the first quadrant and the average symbol coordinate on the fourth quadrant and a distance between the average symbol coordinate on the second quadrant and the average symbol coordinate on the third quadrant.

9. The communication system according to claim 1, wherein the receiving device detects a first angle as the difference when the first difference is more than or equal to the second difference, and detects a second angle as the difference when the first difference is smaller than the second difference.

10. The receiving device according to claim 7, wherein the estimation circuitry detects a first angle as the difference when the first difference is more than or equal to the second difference, and detects a second angle as the difference when the first difference is smaller than the second difference.

11. The semiconductor device according to claim 8, wherein the estimation circuitry detects a first angle as the difference when the first difference is more than or equal to the second difference, and detects a second angle as the difference when the first difference is smaller than the second difference.

* * * * *